(12) United States Patent
Taka et al.

(10) Patent No.: US 6,357,935 B1
(45) Date of Patent: Mar. 19, 2002

(54) LENS BARREL CONTROL APPARATUS

(75) Inventors: Hideo Taka, Yokohama; Takanobu Tsunemiya, Chigasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/648,769

(22) Filed: Aug. 28, 2000

(30) Foreign Application Priority Data

Aug. 30, 1999 (JP) ............................. 11-242740
Dec. 6, 1999 (JP) ............................. 11-345894

(51) Int. Cl.[7] ................................. G03B 5/02
(52) U.S. Cl. ................... 396/349; 396/403; 396/511; 396/522; 396/536
(58) Field of Search ................... 396/349, 403, 396/405, 409, 511, 514, 522, 536

(56) References Cited

U.S. PATENT DOCUMENTS 5,432,575 A * 7/1995 Funahashi .................. 396/405
5,534,991 A   7/1996 Maeda et al. .............. 356/3.06
5,937,217 A   8/1999 Ohtsuka et al. ............ 396/310
6,134,389 A  10/2000 Nakayama et al. .......... 396/73

FOREIGN PATENT DOCUMENTS

JP         6-258699         9/1994
JP         8-211472      *  8/1996

* cited by examiner

Primary Examiner—Russell Adams
Assistant Examiner—Arthur A Smith
(74) Attorney, Agent, or Firm—Fitzpatrick, Cella, Harper & Scinto

(57) ABSTRACT

A camera or a lens barrel control apparatus of a type in which the locking or unlocking of the cover of a cartridge chamber is controlled by the position of a lens, includes a structure in which, when an abnormality occurs in a driving operation of the lens, or a situation in which the lens does not stop at a predetermined position occurs, the lens is forcibly driven to move to a position for locking or unlocking the cover of the cartridge chamber.

34 Claims, 17 Drawing Sheets

LENS BARREL CONTROL APPARATUS

BACKGROUND OF THE INVENTION

1. Field of the Invention

This invention relates to a camera or a lens barrel driving control apparatus in which a cartridge chamber cover can be set to one of a locked state and an unlocked state by the driving position of a lens barrel.

2. Related Background Art

A cover lock mechanism for preventing the cover of a cartridge chamber (hereinafter referred to as the cartridge chamber cover) from being opened by mistake is disclosed in Japanese Patent Application Laid-Open No. 6-258699, Japanese Patent Application Laid-Open No. 8-211472, etc. For example, a photo-taking lens barrel is constructed into a collapsible mount type so that when the barrel is in its protruded state during photographing or in its pushed-in state during containing, the lock member of the cartridge chamber cover may be set to a locking position and the photo-taking lens barrel is designed to be capable of assuming a third state other than this photographing state and the contained state, and in that state, the lock member of the cartridge chamber cover may be set to a lock releasing position. Thereby, the cartridge chamber cover can be locked during photographing and during containing, and can be set to the third state only when necessary to thereby open the cartridge chamber cover. Also, it is disclosed that to bring about the third state of the photo-taking lens barrel for setting the lock member of the cartridge chamber cover to a lock-releasing position, the photo-taking lens barrel is position-changed in the direction opposite to the direction from the contained state toward the photographing state (over-collapsed position) or the photo-taking lens barrel is stopped at a position between the photographing state and the contained state.

SUMMARY OF THE INVENTION

One aspect of the application is to provide a camera or a lens barrel control apparatus for controlling the locking or unlocking of a cartridge chamber cover by the position of a lens barrel, wherein when an abnormality has occurred during lens driving control, the lens is forcibly moved to an unlocked position to thereby bring about a state in which a cartridge can be taken out.

One aspect of the application is to provide a camera or a lens barrel control apparatus for controlling the locking or unlocking of a cartridge chamber cover by the position of a lens barrel, wherein when an abnormality has occurred during lens driving control, the lens is forcibly moved to a locked position to thereby prevent the cartridge chamber from being inadvertently opened.

Other objects of the present invention will become more fully apparent from the following description of some embodiments of the invention taken in conjunction with the accompanying drawings.

DESCRIPTION OF THE PREFERRED EMBODIMENTS

Figure 1:
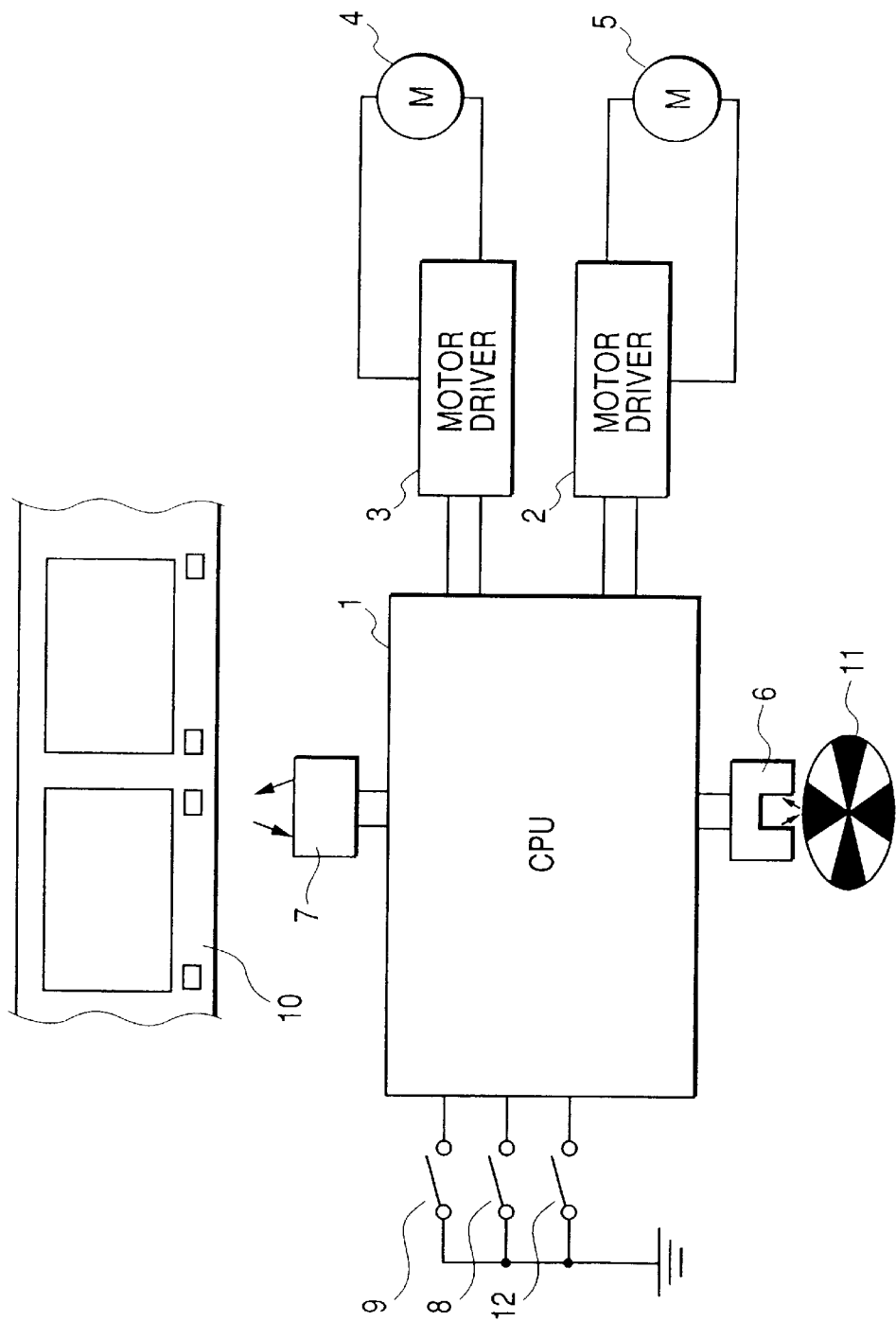
FIG. 1 is a block diagram schematically showing the construction of a camera according to each embodiment of the present invention.

The present invention will hereinafter be described in detail with respect to some embodiments thereof shown in the drawings.

First Embodiment

FIG. 1 is a block diagram schematically showing the construction of a camera provided with a lens barrel driving control apparatus according to a first embodiment of the present invention which makes the locking of a cartridge chamber cover possible.

Figure 2:
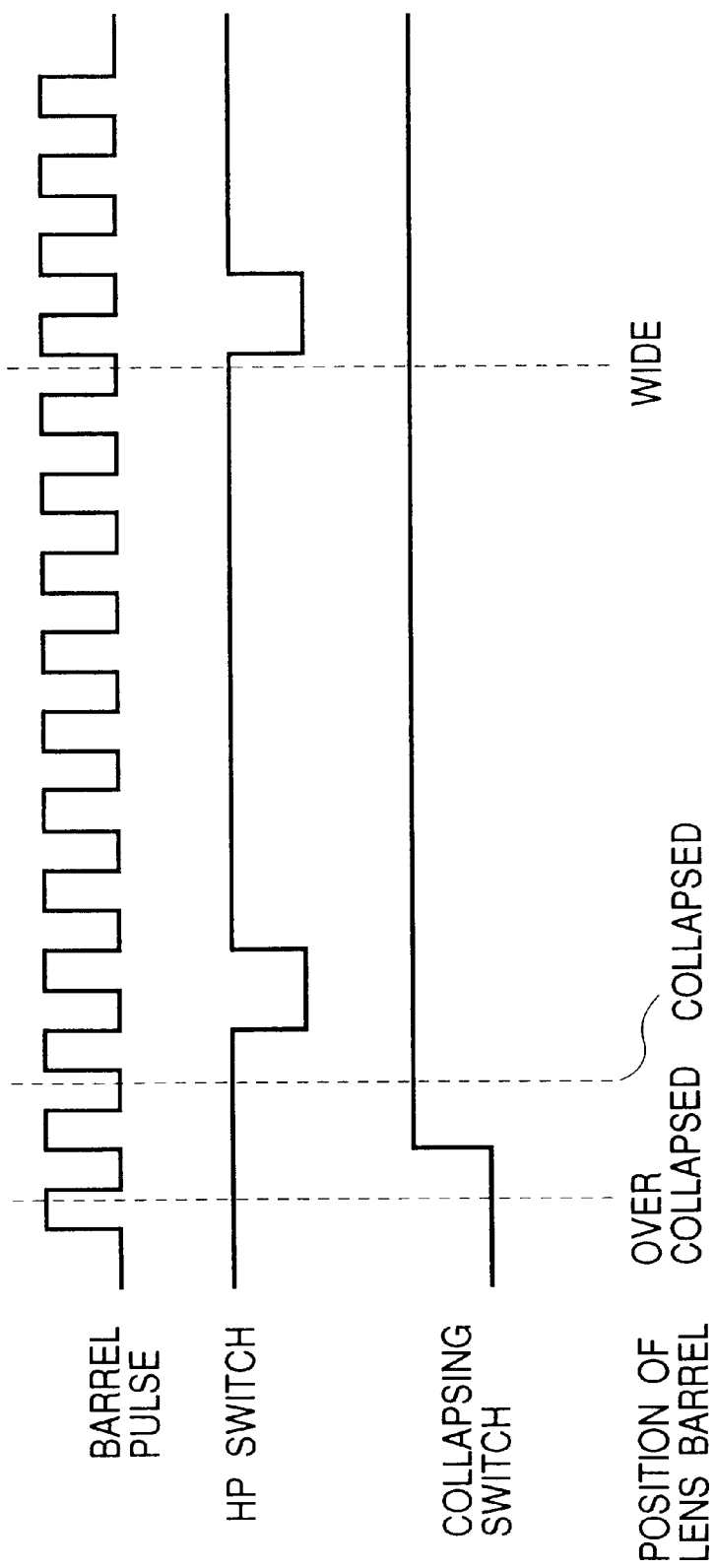
FIG. 2 shows the relations among a barrel pulse, an HP switch, a collapsing switch and the position of a lens barrel according to each embodiment of the present invention.

In FIG. 1, the reference numeral 1 designates a CPU for controlling the operation of a lens barrel which will be described later, the reference numerals 2 and 3 denote motor drivers, the reference numeral 4 designates a DC motor (hereinafter referred to as the barrel motor) for driving a lens barrel driving-controlled by the motor driver 3, and the reference numeral 5 denotes a DC motor (hereinafter referred to as the feeding motor) for film feeding driving-controlled by the motor driver 2. The reference numeral 6 designates a photointerrupter for detecting the signal of a pulse plate 11 rotated in operative association with the movement of the lens barrel (generating a barrel pulse shown in FIG. 2), the reference numeral 7 denotes a photoreflector for detecting the movement of film 10 by perforation, the reference numeral 8 designates a collapsing switch adapted to be ON (see FIG. 2) when the lens barrel has come to a particular position (over-collapsed position), the reference numeral 9 denotes an HP switch adapted to be ON at each stop position (each zoom position) of the lens barrel as shown in FIG. 2, and the reference numeral 12 designates a switch for rewinding the film 10 (manual rewind switch).

Figure 3:
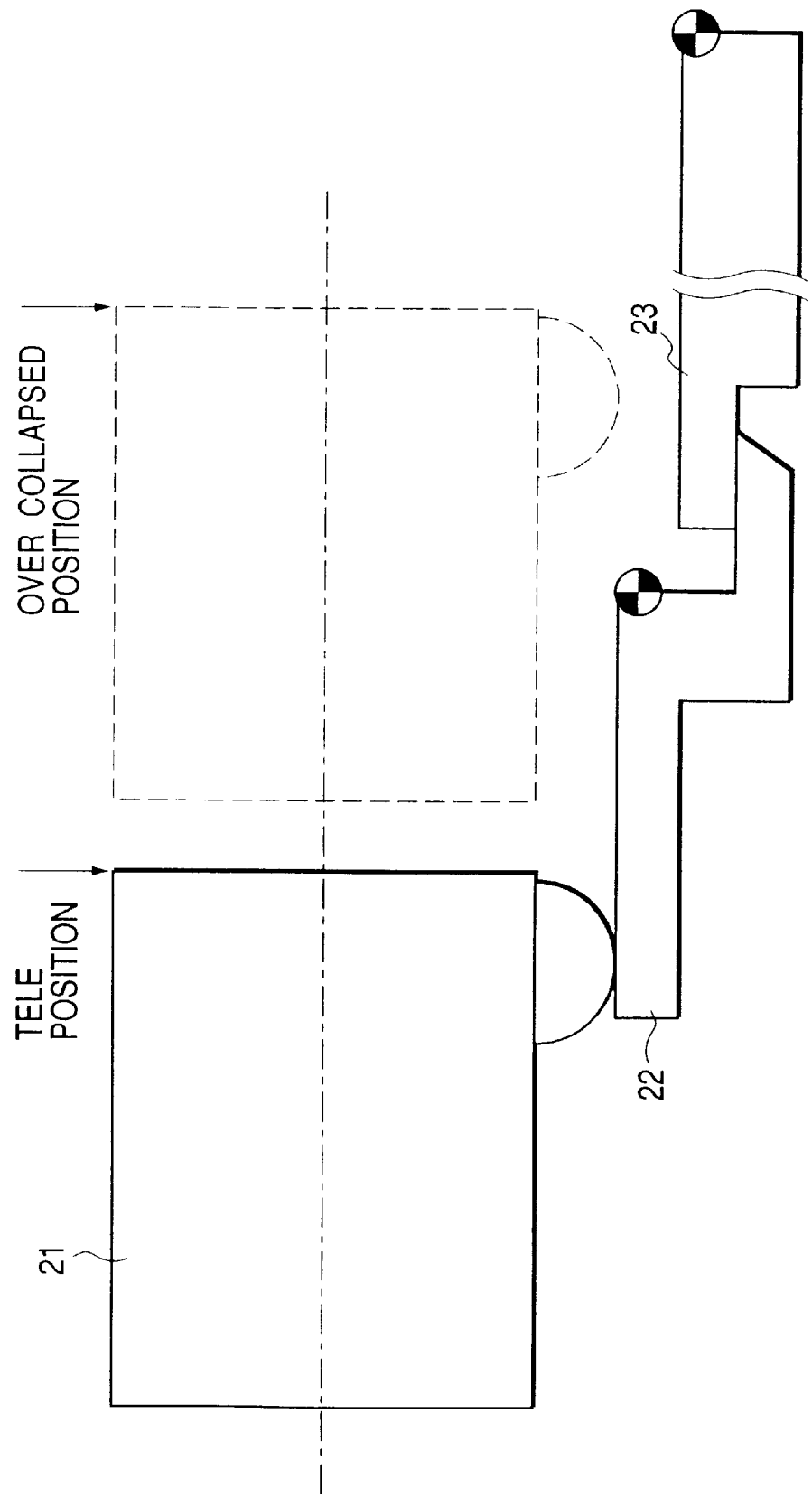
FIG. 3 shows the mechanical constructions of the essential portions of the camera according to each embodiment of the present invention.

FIG. 3 is a side view showing the constructions of the essential portions of the camera of the above-described construction, the reference numeral 21 denotes the lens barrel, the reference numeral 22 designates an opening-closing knob, and the reference numeral 23 denotes a cartridge chamber cover. It is to be understood that the cartridge chamber cover is manually or electrically opened by an operator's operation only when the lens barrel lies at an over-collapsed position.

In the camera of the above-described construction, the operation of the essential portions will hereinafter be described with reference to the flow charts of FIGS. 4 to 7.

The operation during the rewinding of the film 10 will first be described with reference to the flow chart of FIG. 4.

At a step #501, a CPU 1 judges whether a switch (MRSW) 12 for arbitrarily rewinding the film 10 is ON, and if it is ON, even if the frame is a frame being photographed, advance is made to a step #510 to rotate the feeding motor 5 in a rewinding direction through the driver 2, and rewind control is started. Also, when at a step #502, it is judged that photographing has been terminated to the last frame, advance is made to the step #510 to effect automatic film rewinding, and rewind control is started.

Figure 5:
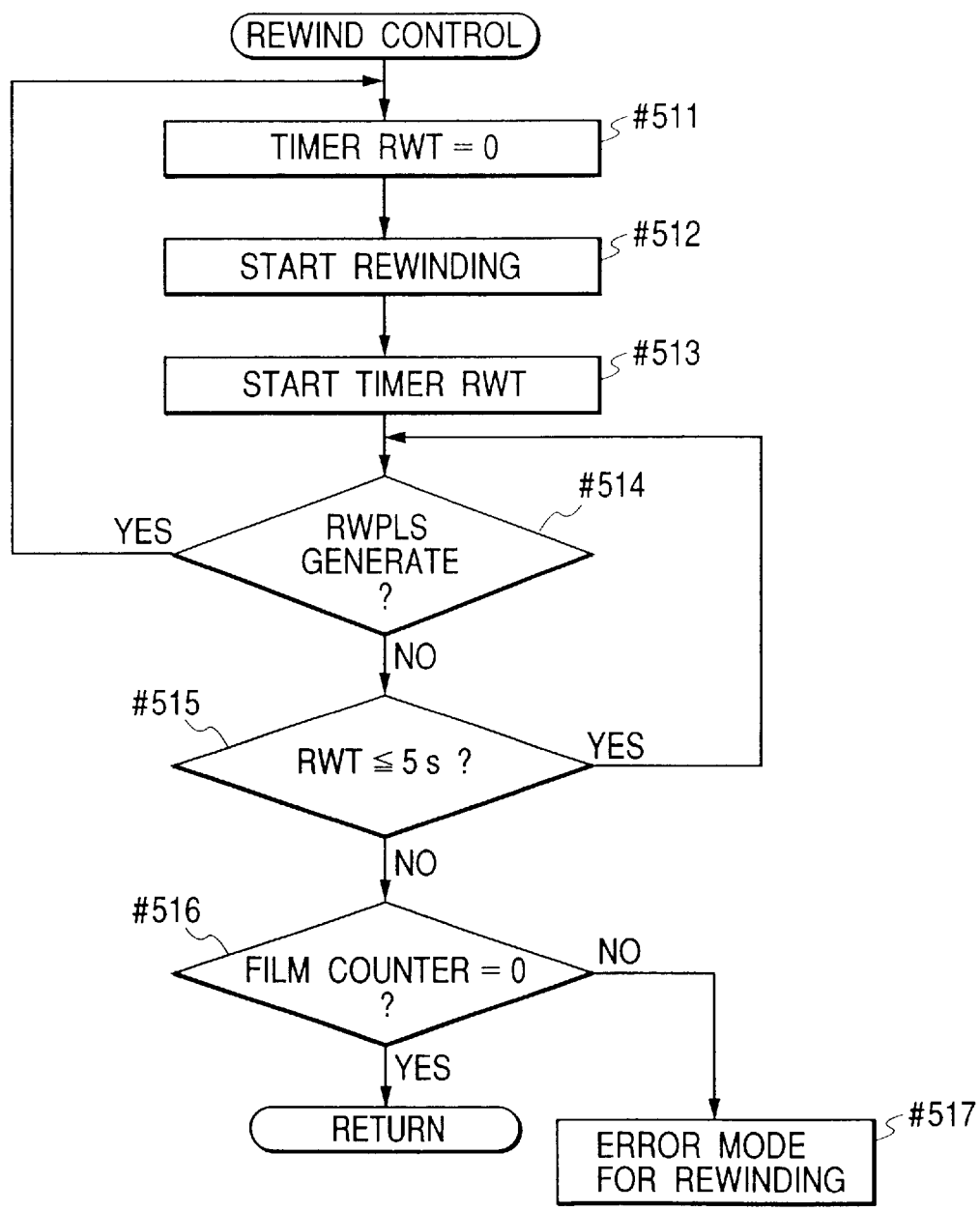
FIG. 5 is a flow chart showing the detailed operation during the rewind control of FIG. 4.

In this rewind control, as shown in the flow chart of FIG. 5, the CPU 1 first clears a rewinding timer RWT and is prepared to start rewinding. This timer RWT is for detecting an abnormality such as the stoppage of rewinding in the course thereof. At the next step #512, electric power is supplied to the feeding motor 5 in a film rewinding direction, and the rewinding of the film 10 is started. At the next step #513, the timer RWT is s tar ted. A t the subsequent step #514, the perforation of the film is detected by the photoreflector 7 to monitor the film rewinding situation. If the film is being normally fed, a pulse signal (RWPLS) is generated in the photointerrupter 6 and therefore, on the assumption that rewinding is effected during the time when this pulse signal is being produced, return is made to the step #511, whereafter a similar operation is repeated.

If thereafter, at step #514, the pulse signal becomes undetectable, because an abnormality occurs in film feeding, or because rewinding has been terminated, the CPU 1 proceeds to step #515, where a predetermined time (in this case, 5 seconds) is counted. This count time is set to a time about ten times as long as the pulse interval when the film 10 is fed normally and the perforation thereof is detected and pulse signal is output.

If at this step #515, it is detected that there is an abnormality in the pulse interval, advance is made to a step #516, where the CPU 1 confirms a film counter contained therein. If this film counter is other than zero sheet, it is judged that film rewinding has not been effected normally, and the CPU 1 enters an error mode for rewinding. In this case, operations other than re-winding are inhibited and trouble caused by the other operations is prevented.

Figure 4:
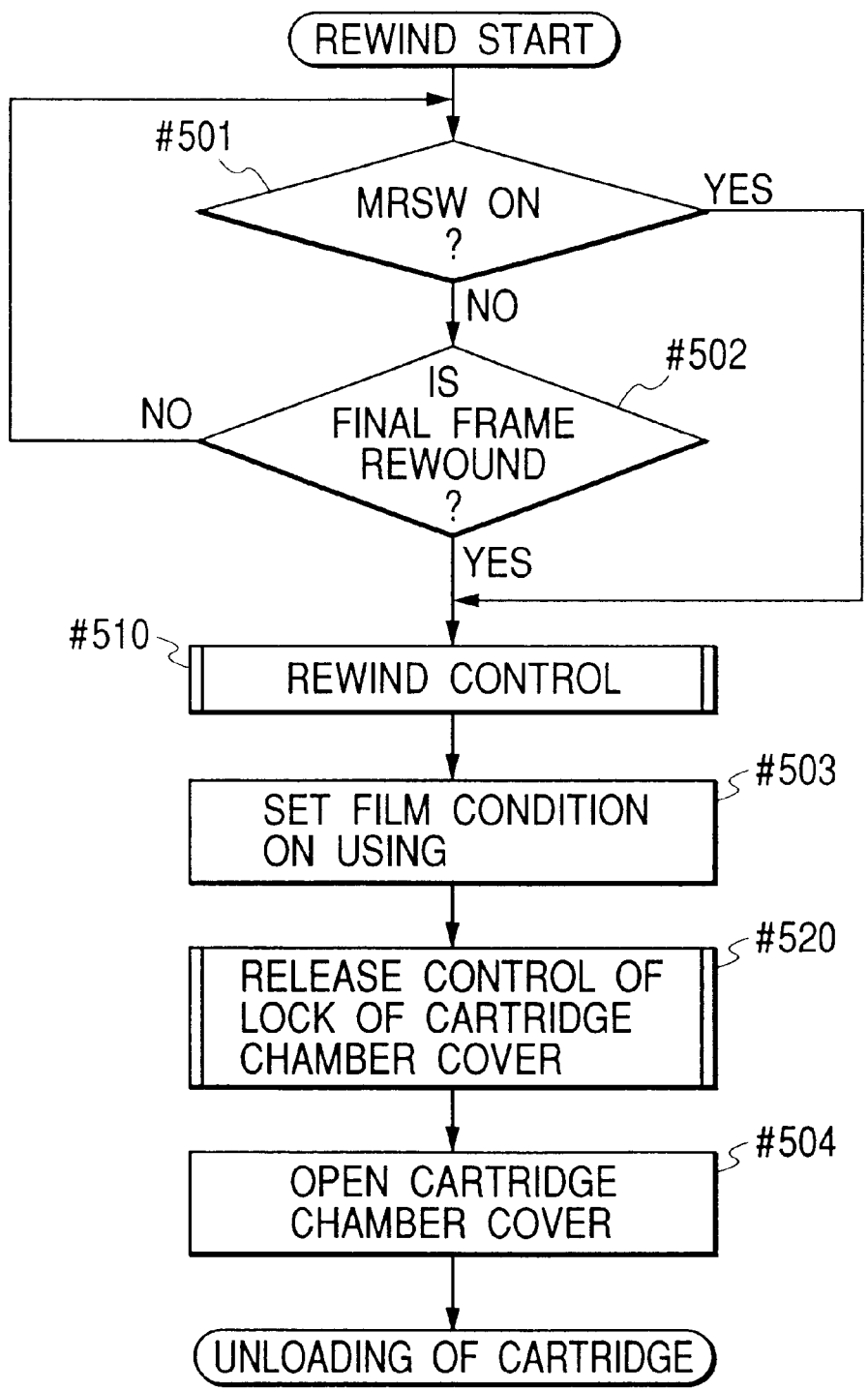
FIG. 4 is a flow chart showing the operation of the camera according to each embodiment of the present invention during film rewinding.

If the film counter is zero sheet, it is judged that the rewinding operation has been performed normally, and the CPU 1 proceeds to the step #503 of FIG. 4.

Turning back to FIG. 4, at a step #503, the film condition on using is set. The setting of this condition on using is done by the stop timing of the feeding motor 4. The indication of the film condition on using is such that when the number of actually photographed sheets is small relative to the number of photographable sheets (rewinding is effected in the course of photographing), the film is set to the position "photographed up to halfway". Also, when the number of photographable sheets have all been photographed, the film is set to "photographed", and in the case of unused film, it is set to "unused".

When the above-described setting of the condition on using is terminated, advance is made to a step #520, where the release control of the locking of the cartridge chamber cover is entered.

The lock mechanism of the cartridge chamber cover 23 in the present embodiment is effected by the control of the stopped position of the lens barrel 21, and at a position of time whereat rewinding has been completed and the condition on using is being set, the cartridge chamber cover 23 is in its locked state.

The control for releasing the locking of the cartridge chamber cover is not entered until the film condition on using is set. This will hereinafter be described specifically with reference to the flow chart of FIG. 6.

When rewinding is completed and the condition on using is set, the cartridge becomes removable at any time. If in this state, the locking of the cartridge chamber cover 23 is released, the film can be removed.

To release the locking of the cartridge chamber cover 23, the lens barrel 21 must first be moved. At a step #101, a lens timer LENST is set to 0, and at the next step #102, the lens timer LENST is started and at a same time, in order to move the lens barrel 21 toward the side for releasing the locking of the cartridge chamber cover, the barrel motor 4 is electrically energized in the over-collapsing direction through the driver 3. The lens timer LENST is provided for determining the electrical energizing time of the barrel motor 4. When the lens barrel 21 begins to move, a pulse signal (barrel pulse) is output by the photointerrupter 6 in the case of a normal operation. When the barrel motor further continues to be electrically energized, the lens barrel 21 arrives at a predetermined position and the collapsing switch 8 becomes ON. When this change is detected at step #104, it is detected that the lens barrel 21 has been moved to a position in which the locking of the cartridge chamber cover has been released. When in this manner, the lens barrel 21 completes its movement to the predetermined position, advance is made to step #106, where the driving of the barrel motor 4 is stopped, and return is made to step #504 of FIG. 4, where the cartridge becomes movable.

Figure 6:
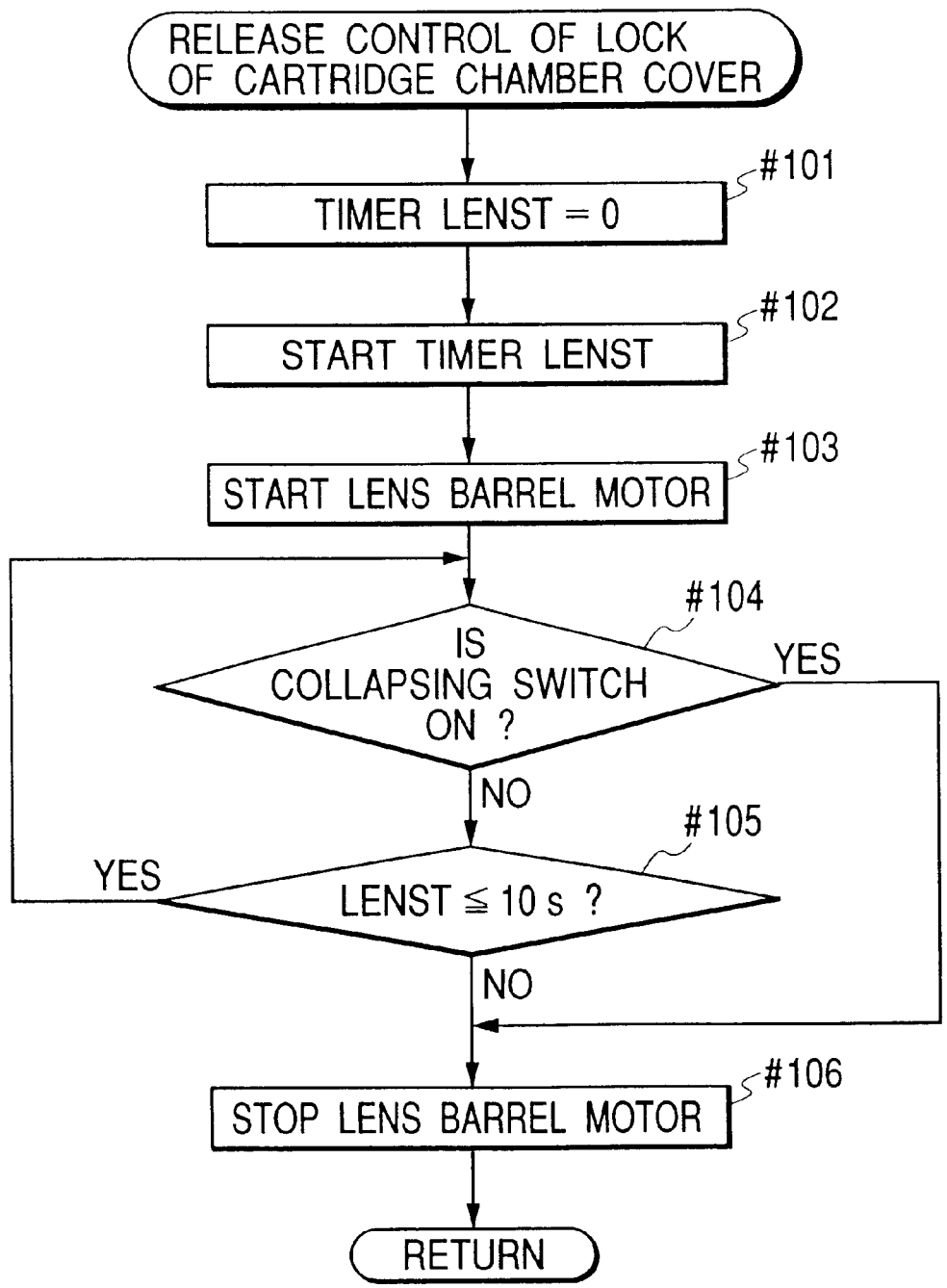
FIG. 6 is a flow chart showing the operation of the cartridge chamber cover lock release control of FIG. 4 according to a first embodiment of the present invention.

On the other hand, if at step #104 of FIG. 6, the collapsing switch 8 does not become ON, that is, if the operation of the collapsing switch 8 is abnormal or driving is abnormal , advance is made to step #105, where electrical energization is continued for a predetermined time (in this case, 10 seconds) #105→#104→#105 . . . ), whereafter advance is made to step #106, where the barrel motor 4 is stopped as described above. As this electrical energizing time, a time sufficient for the lens barrel 21 to be movable to a position for releasing the locking is set.

According to the above-described first embodiment, even when the collapsing switch 8 for stopping the lens barrel 21 at the position for releasing the locking of the cartridge chamber cover 23 is abnormal, the barrel motor 4 is electrically energized for a predetermined time, whereby it becomes possible to move the lens barrel 21 to a position in which the locking of the cartridge chamber cover 22 can be released.

Second Embodiment

The operations of the essential portions of a camera according to a second embodiment of the present invention will now be described with reference to the flow chart of FIG. 7. It is to be understood that the construction of the camera is similar to that in the above-described first embodiment.

The flow from the completion of the rewinding of the film to the setting of the condition on using is similar to that in the above-described first embodiment and therefore need not be described, and only the portions of the control of releasing the locking of the cartridge chamber cover 23 will be described. With regard to the portions of the control similar to those in FIG. 6, the same numbers as those in FIG. 6 are used in the second and less significant places of the step numbers.

Figure 7:
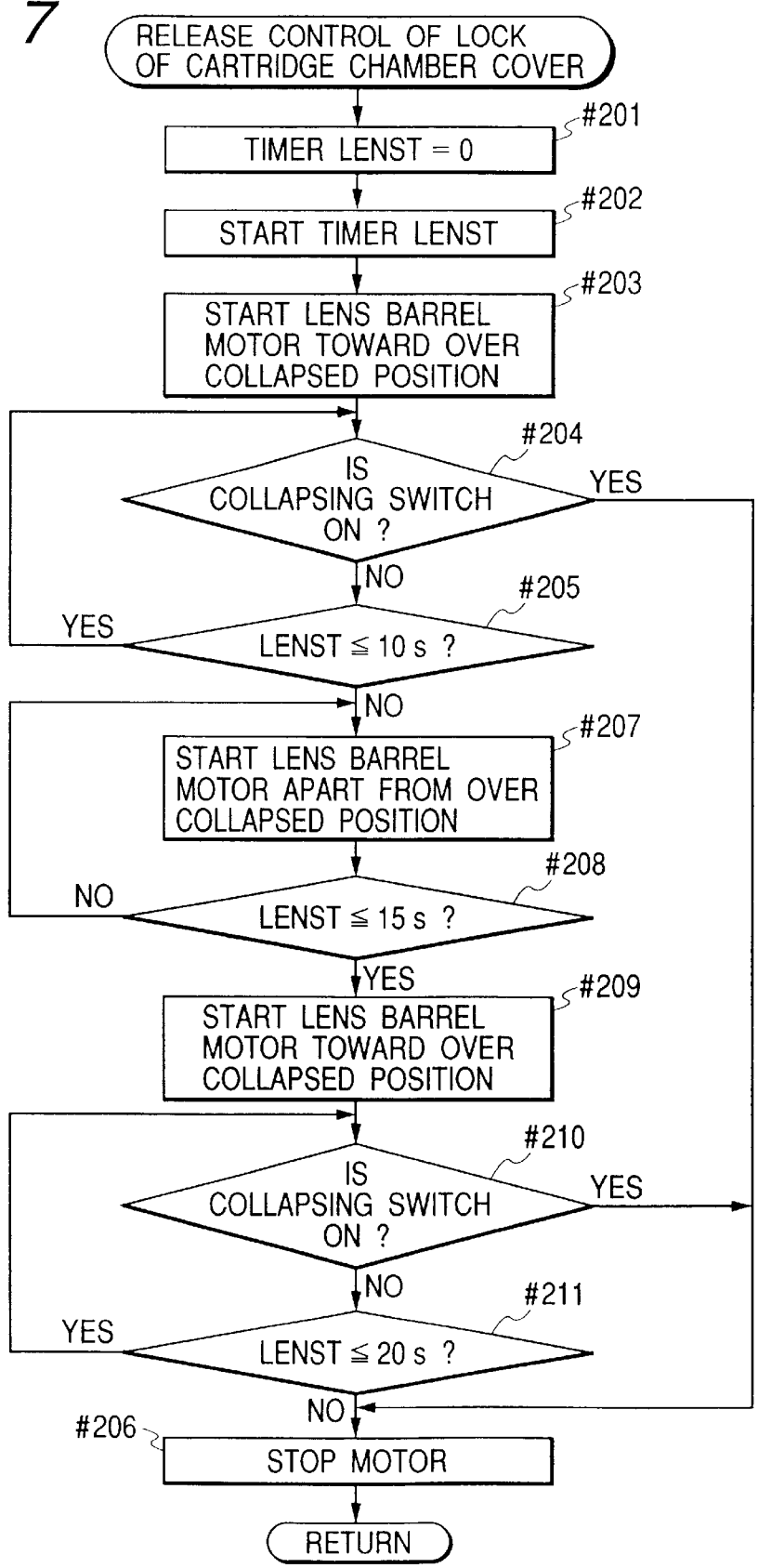
FIG. 7 is a flow chart showing the operation of the cartridge chamber cover lock release control of FIG. 4 according to a second embodiment of the present invention.

In FIG. 7, at step #201, the lens timer LENST is first set to 0. At the next step #202, the lens timer LENST is started and at the same time, the barrel motor 4 is electrically energized to move in the over-collapsing direction to move the lens barrel 21 to the side for releasing the locking of the cartridge chamber cover. When the lens barrel 21 begins to move, in the case of a normal operation, a barrel pulse is output by the photointerrupter 6. When the electrical energization is further continued, the lens barrel arrives at a predetermined position and the collapsing switch 8 becomes ON. When this change is detected at step #204, it is judged that the lens barrel 21 has been moved to a position in which the locking of the cartridge chamber cover has been released, and advance is made to step #206, where the driving of the barrel motor 4 is stopped at a point of time whereat the lens barrel 21 has been moved to the predetermined position, and return is made to step #504 of FIG. 4, where the cartridge becomes removable.

On the other hand, if at step #204, the collapsing switch 8 does not become ON, that is, if the operation of the collapsing switch 8 is abnormal or driving is abnormal, advance is made to step #205, where it is determined whether a predetermined time (in this case, 10 seconds) has elapsed, and if it has not elapsed, return is made to step #204, where similar operations are repeated. When the collapsing switch 8 does not become ON even after the predetermined time has elapsed, advance is made from step #205 to step #207, where the barrel motor 4 is electrically energized in the reverse direction. As regards this reverse electrical energization, in the case of electrical energization in one direction, there is a case where the barrel motor cannot be rotated under the influence of a jam (catch) or the like of a gear or the like and therefore, on the assumption that there is a case where the catch can be removed by the barrel motor being reversely rotated a little, the operation of step #207 is performed. At the next step #208, the barrel motor 4 is reversely rotated for a predetermined time (in this case, 15 seconds), whereafter advance is made to step #209, where the barrel motor 4 is again changed to forward rotation, and at the subsequent steps #210 and #211, it is waited for the collapsing switch 8 to become ON within a predetermined time (in this case, 20 seconds). If the ON state of the collapsing switch 8 cannot be detected within the predetermined time, advance is made to step #206, where the electrical energization of the barrel motor 4 is stopped. This electrical energizing time is set to a time sufficient for the lens barrel 21 to be movable to a position for releasing the locking.

Also, if at step #210, the ON state of the collapsing switch 8 could be detected within the predetermined time, advance is immediately made to step #206, where the electrical energization of the barrel motor 4 is stopped.

According to the above-described second embodiment, even when the collapsing switch 8 for stopping the lens barrel 21 at the position for releasing the locking of the cartridge chamber cover 23 is abnormal, it becomes possible to effect the electrical energization of the barrel motor 4 in forward and reverse directions for a predetermined time, to thereby remove the catch and move the lens barrel 21 to a position in which the locking of the cartridge chamber cover 23 can be released.

Third Embodiment

The operations of the essential portions of a camera according to a third embodiment of the present invention will now be described with reference to the flow chart of FIG. 8. It is to be understood that the construction of the camera is similar to that of the above-described first embodiment.

The flow from the completion of the rewinding of the film to the setting of the condition on using is similar to that in the above-described first embodiment and therefore need not be described, and description will be made of only the portions of the control of releasing the locking of the cartridge chamber cover 23. With regard to the portions of the control similar to those in FIG. 6, the same numbers as those in FIG. 6 are used in the second and less significant places of the step numbers.

Figure 8:
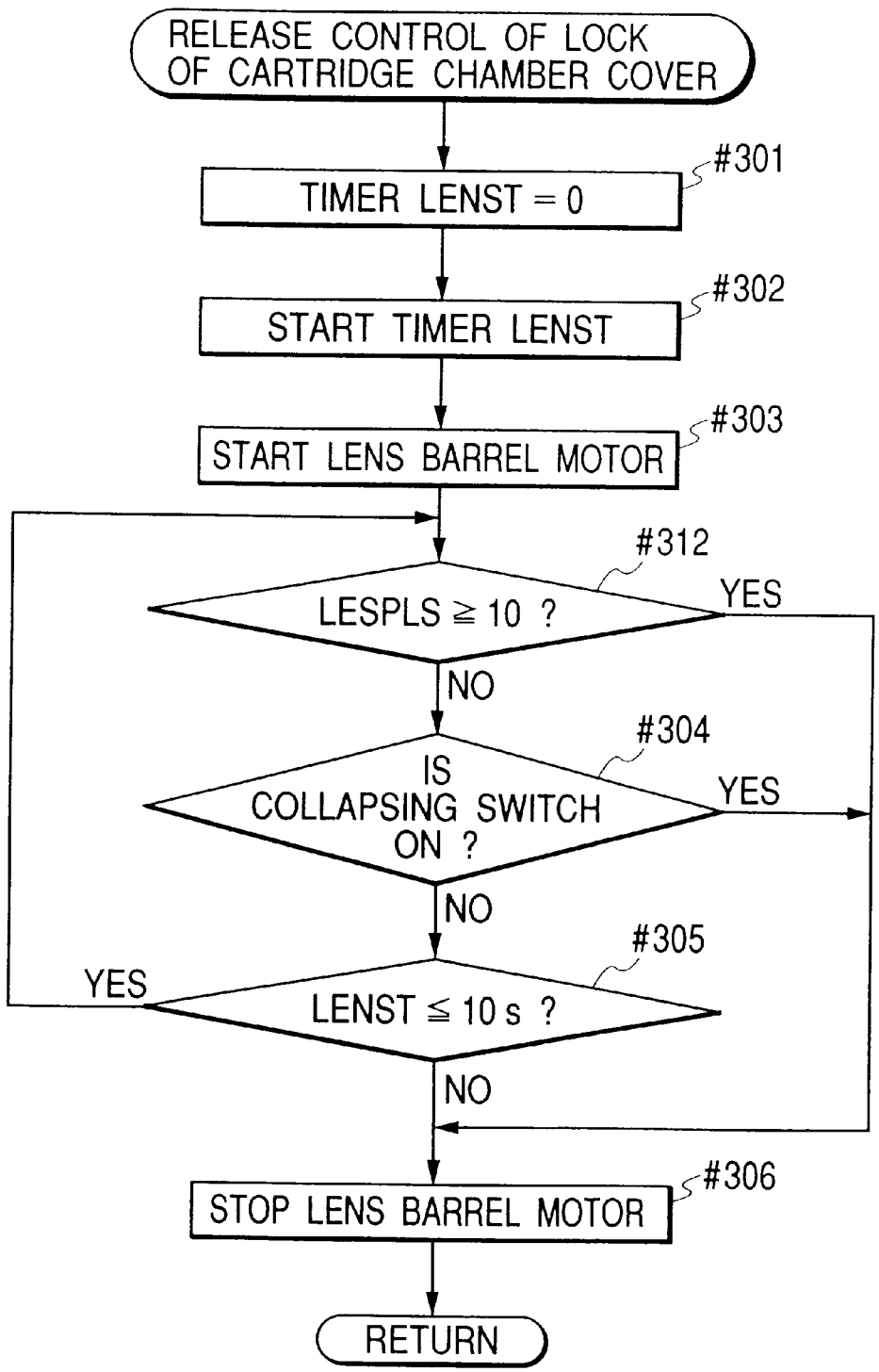
FIG. 8 is a flow chart showing the operation of the cartridge chamber cover lock release control of FIG. 4 according to a third embodiment of the present invention.

In FIG. 8, at step #301, the lens timer LENST is first set to 0. At the next step #302, the lens timer LENST is started and at the same time, the barrel motor 4 is electrically energized in the over-collapsing direction to move the lens barrel 21. When the lens barrel 21 begins to move, in the case of a normal operation, a barrel pulse is output by the photointerrupter 6, and this barrel pulse is counted. Electrical energization is further continued, and at the next step #312, before the barrel pulse becomes 10 or greater, the lens barrel 21 arrives at a predetermined position and the collapsing switch 8 becomes ON. At step #304, this change is detected through step #312, that is, it is detected that the lens barrel 21 has been moved to the position for releasing the locking of the cartridge chamber cover, whereupon advance is made to step #306, where the driving of the barrel motor 4 is stopped, and return is made to step #504 of FIG. 4, where the removal of the cartridge becomes possible.

Also, when the collapsing switch 8 does not become ON at step #304 of FIG. 8 and at step #312, it is detected that the barrel pulse number has become 10 or greater before step #305, it is detected that a predetermined time has elapsed for a case where the operation of the collapsing switch 8 is abnormal or a case where driving is abnormal, advance is made to step #306. This is to try to use all the signals output during the operation of the lens barrel and cover a bad portion as a countermeasure for a case where bad operation of the collapsing switch 8 has occurred, although originally the detection of the position for releasing the locking of the cartridge chamber cover is effected by the collapsing switch 8. Of course, the pulse number is set to a rather greater number so that the barrel motor 4 may not be stopped on the barrel pulse side when the switch 8 is normally operating. Comparing in turns of the electrically energizing time, there is the following relation:

The time till the stoppage of the motor:
the over-collapsing switch during normal time <barrel pulse
<predetermined time (electrical energizing time)

When at step #312, the barrel pulse is counted as a predetermined number, it is judged that the lens barrel 21 has arrived at the position for releasing the locking of the cartridge chamber cover, and advance is made to step #306, where the electrical energization of the barrel motor 4 is stopped. This electrical energizing time is set to a pulse number sufficient for the lens barrel 21 to be movable to a position in which the locking is released.

According to the above-described third embodiment, even when the collapsing switch 8 for stopping the lens barrel 21 at the position for releasing the locking of the cartridge chamber cover is abnormal, it becomes possible to utilize an other signal produced by the driving of the lens barrel 21 to thereby move the lens barrel 21 to a position in which the locking of the cartridge chamber cover 23 can be released.

According to each of the above-described embodiments, in the construction wherein the cartridge chamber cover 23 is locked and unlocked by the position of the lens barrel 21, it becomes possible to reliably take out the cartridge even in a situation wherein an abnormality occurs to the operation of the lens barrel 21 and sufficient barrel driving control cannot be effected.

Specifically, even in a situation wherein there is an abnormality in the collapsing switch 8 indicating the position of the lens barrel 21 in which the locking of the cartridge chamber cover 23 can be released and a signal is not produced, electric power supply is effected to the barrel motor 4 for a predetermined time, whereby the locking of the cartridge chamber cover 23 can be released as far as possible.

Also, when there is an abnormality in the collapsing switch 8, the electric power supply to the barrel motor 4 is effected in the forward and reverse directions so that any removable catch may be removed and the locking of the cartridge chamber cover 23 can be released.

Also, even if there is an abnormality in the collapsing switch 8, means replacing the switch (means for generating a barrel pulse) is utilized to drive the lens barrel to a predetermined position so that the locking of the cartridge chamber cover 23 can be released.

As described above, there is realized such a system that the film can be reliably taken out when there is brought about a situation in which the film is to be taken out (the film has been rewound).

Also, as described above, the lens barrel 21 is driven by the barrel motor 4 only when cartridge chamber cover 23 need be opened and therefore, the cartridge chamber cover 23 can be prevented from being inadvertently opened, and the exposure of the film by a wrong operation can be prevented. Further, an actuator for exclusive use is not used, but the driving force of the barrel motor 4 for driving the lens barrel 21 is utilized to effect the locking and unlocking of the cartridge chamber cover 23 and therefore, the camera does not become bulky and does not increase in cost.

Fourth Embodiment

Figure 9:
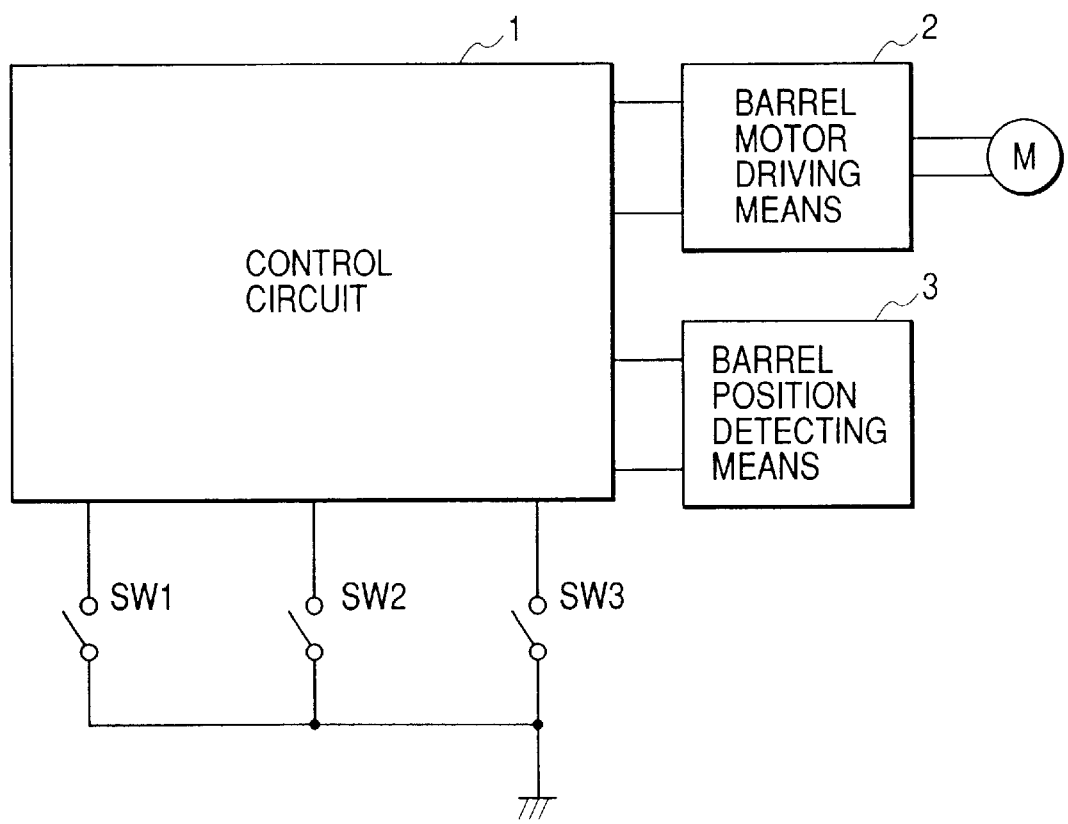
FIG. 9 is a block diagram showing the electrical constructions of the essential portions of a camera according to a fourth embodiment of the present invention.

FIG. 9 is a block diagram showing the electrical constructions of the essential portions of a camera according to a fourth embodiment of the present invention. In FIG. 9, the reference numeral 1 designates a control circuit comprising, for example, a microcomputer which operates as means for controlling the driving of the lens barrel. The reference numeral 2 denotes barrel motor driving means for driving a barrel motor M to operate zoom, collapsing and a lock mechanism for the cartridge chamber cover. The reference numeral 3 designates barrel position detecting means for outputting the barrel position information of the lens barrel comprising a zoom pulse switch (hereinafter referred to as the switch ZPSW), a collapsing switch (hereinafter referred to as the switch TDSW) and a barrel pulse signal (hereinafter referred to as the pulse signal PLS) which will be described later, and the barrel position detecting means 3 gives to the control circuit 1 position information corresponding to the zoom waiting position and contained position of the lens barrel and the releasing position of the lock mechanism for the cartridge chamber cover. SW1 denotes a main switch for changing over the ON/OFF of the camera operation, SW2 designates a tele switch for indicating the zooming operation in the direction toward the telephoto side, and SW3 denotes a wide angle switch for indicating the zooming operation in the direction toward the wide angle side.

Figure 10:
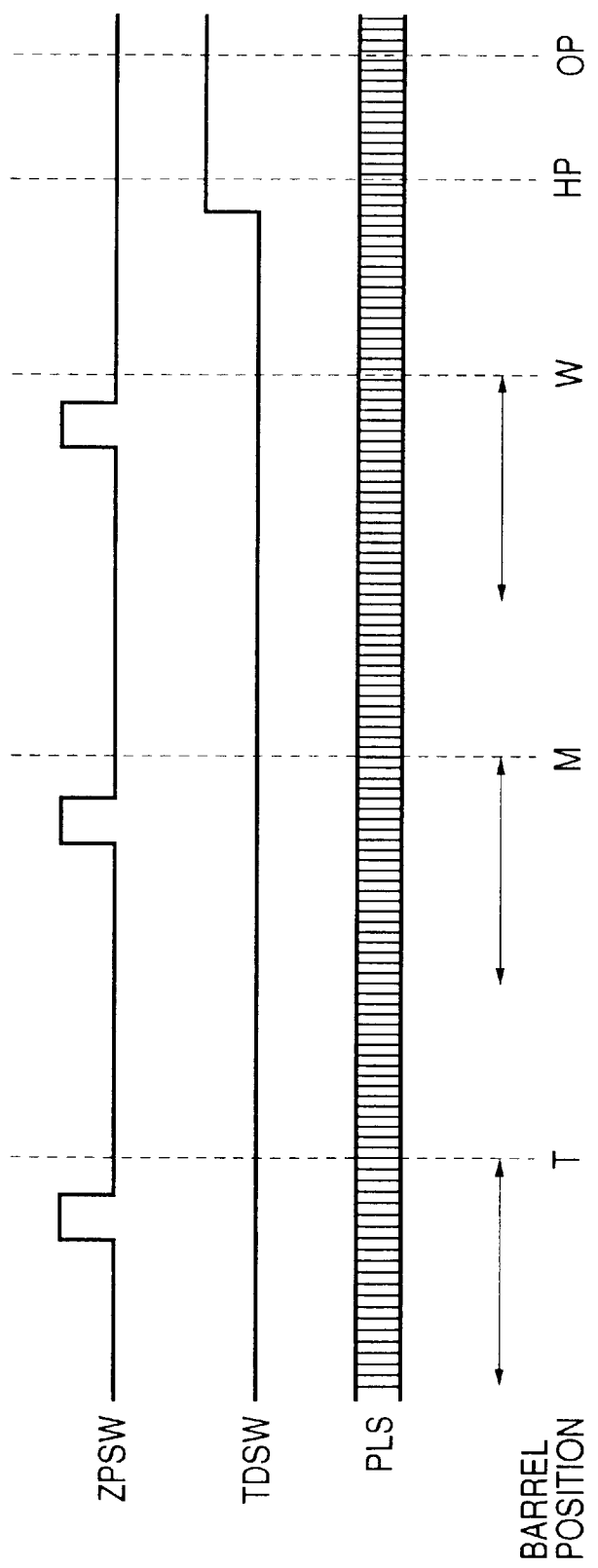
FIG. 10 shows the correspondence between barrel position information and barrel position according to the fourth embodiment of the present invention.

FIG. 10 shows an example of the correspondence among the switches ZPSW and TDSW and the pulse signal PLS in the barrel position detecting means 3 and the position of the lens barrel.

In FIG. 10, the switch ZPSW is a switch which outputs the timing providing the reference position of T (tele), M (middle) and W (wide) during the zoom movement of the lens barrel, and the switch TDSW is a switch which outputs the timing providing the reference of HP (lens containing position) and OP (the releasing position of the lock mechanism for the cartridge chamber cover). The pulse signal PLS is a signal synchronized with the rotation or the like of the barrel motor M detected, for example, by a photointerrupter when the barrel motor M is driven by the barrel motor driving means 2.

The control circuit 1 operating as lens barrel driving control means, on the basis of this barrel position information, defines locations moved by a predetermined PLS numbers from the switch ZPSW in zoom as the waiting positions (W, M, T) in each cycle of zoom photographing, and effects focus control by auto focusing within the ranges of arrows during photographing, and defines a location moved by a predetermined PLS number from the switch TDS in the movement to the lens containing position HP as the lens containing position HP, and defines a location further moved by a predetermined PLS number from the switch TDSW in the movement to the lock mechanism releasing position OP of the cartridge chamber cover as the lock mechanism releasing position OP of the cartridge chamber cover.

The operation of the present embodiment is executed by the program of the control circuit 1, and that operation will hereinafter be described with reference to the flow charts of FIGS. 11 to 16.

Figure 11:
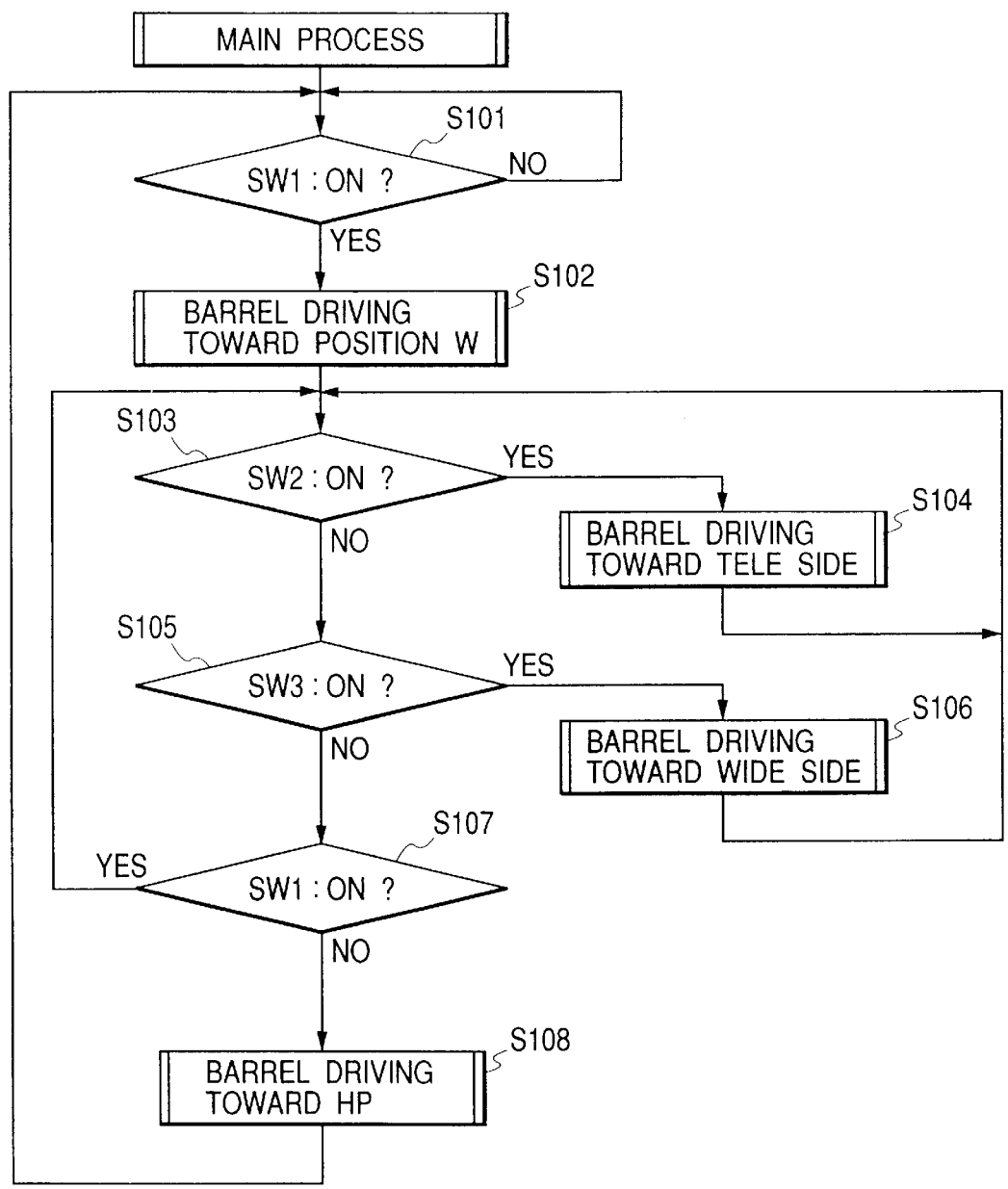
FIG. 11 is a flow chart showing the main operation in the fourth embodiment of the present invention.

FIG. 11 is a flow chart showing the main operation of the camera having the above-described construction according to the fourth embodiment of the present invention.

First, at step S101, it is determined whether SW1, which is a main switch for changing over the ON/OFF state of the camera operation, is ON, and if the main switch SW1 is OFF, this step is repeated until the main switch SW1 becomes ON. Thereafter, when the main switch SW1 becomes ON, advance is made to step S102, where barrel driving toward the wide angle end waiting position W of zoom, which is the flow of the barrel driving toward the waiting position W of FIG. 12 (which will be described later) is effected, and by RET command, advance is made to the next step S103.

At step S103, it is determined whether the tele switch SW2 for indicating barrel driving toward the tele side of zoom is ON, and if tele switch SW2 is ON, advance is made to step 104, where barrel driving toward the tele side of zoom, which is the flow of tele driving of FIG. 14 (which will be described later) is effected, and by the RET command, return is made to step S103. Also, if the tele switch SW2 is OFF, advance is made to step S105, where it is determined whether the wide angle switch SW3 for indicating barrel driving toward the wide angle side of zoom is ON, and if this wide switch SW3 is ON, advance is made to step S106, where barrel driving toward the wide angle side of zoom, which is the flow of the wide angle driving of FIG. 15 (which will be described later) is effected, and by the RET command, return is made to step S103. Also, if at step S105, the wide switch SW3 is OFF, advance is made to step S107.

At step S107, it is determined whether the main switch SW1 is ON, and if the main switch SW1 is ON, return is made to step S103. Also, if the main switch SW1 is OFF, advance is made to step S108, where the driving of the lens barrel toward the contained position HP, which is the flow of the driving toward the contained position of FIG. 16 (which will be described later) is effected, and by the RET command, return is made to step S101.

Figure 12:
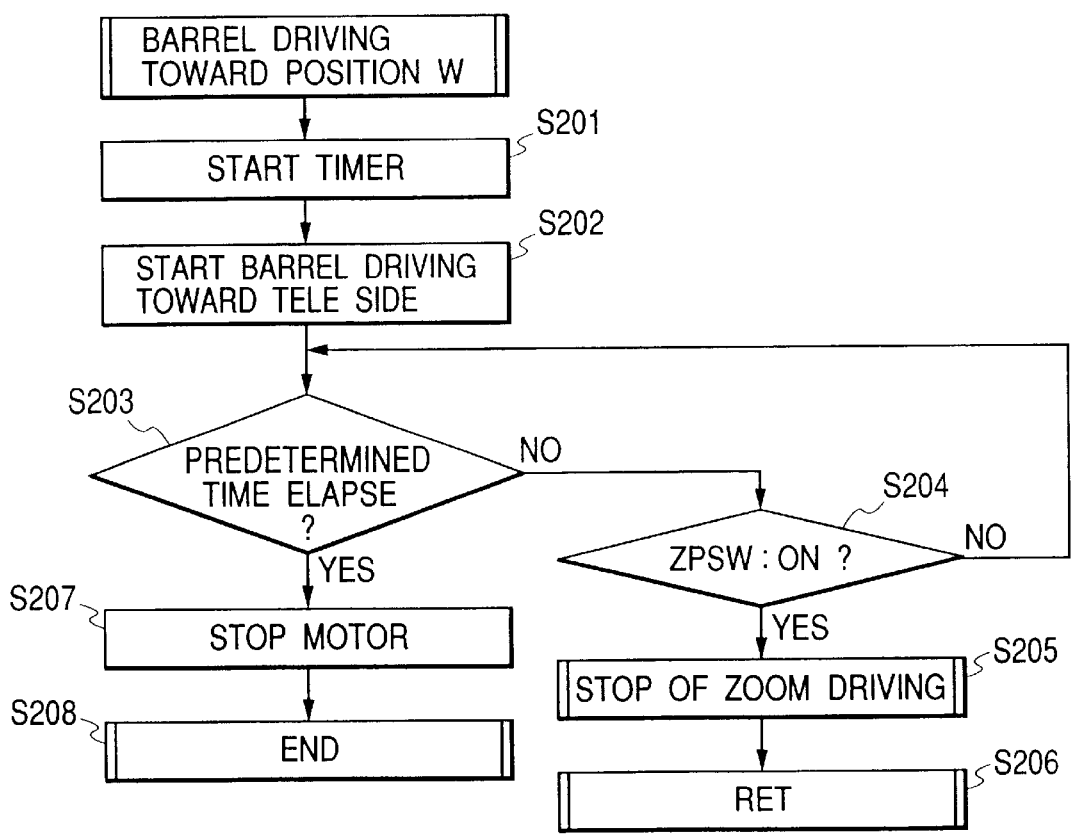
FIG. 12 is a flow chart showing the operation of driving a barrel toward a waiting position W in the fourth embodiment of the present invention.

FIG. 12 is a flowchart showing the operation of barrel driving toward the waiting position W.

First, at step S201, a timer for detecting an abnormality during the driving of the lens barrel from the contained position HP toward the wide angle end waiting position W of zoom is started, and advance is made to step S202. At step S202, the barrel motor M is driven toward the tele side through the barrel motor driving means 2, to drive the lens barrel from the contained position HP toward the wide angle end waiting position W of zoom, and advance is made to step S203. At step S203, it is determined whether a timer time for the detection of an abnormality has elapsed, and if the timer time has not yet elapsed, advance is made to step S204, where it is determined whether the switch ZPSW for indicating the reference position of the wide angle end waiting position W of zoom, through the barrel position detecting means 3, becomes ON. If the switch ZPSW is OFF, step S203 and step S204 are repeated, until the switch ZPSW becomes ON. Thereafter, when at step S204, the switch ZPSW becomes ON, advance is made to step S205, where the stoppage of driving to the wide angle end waiting position W of zoom, which is the flow of the zoom driving stoppage of FIG. 13 (which will be described later) is effected, and advance is made to step S206, where by the RET command, return is made to the main flow of FIG. 11.

Also, when an abnormality occurs to the barrel position detecting means 3 and the ON state of the switch ZPSW cannot be detected, and timer time elapses at step S203, advance is made to step S207. At step S207, the driving of the barrel motor M toward the tele side, which has been effected through the barrel motor driving means 2, is stopped, and advance is made to step S208. At step S208, the camera is out of order and therefore all operations are stopped and terminated. Since this case is after the lens barrel has been driven toward the tele side, the lock mechanism of the cartridge chamber cover remains in its locking position.

Figure 13:
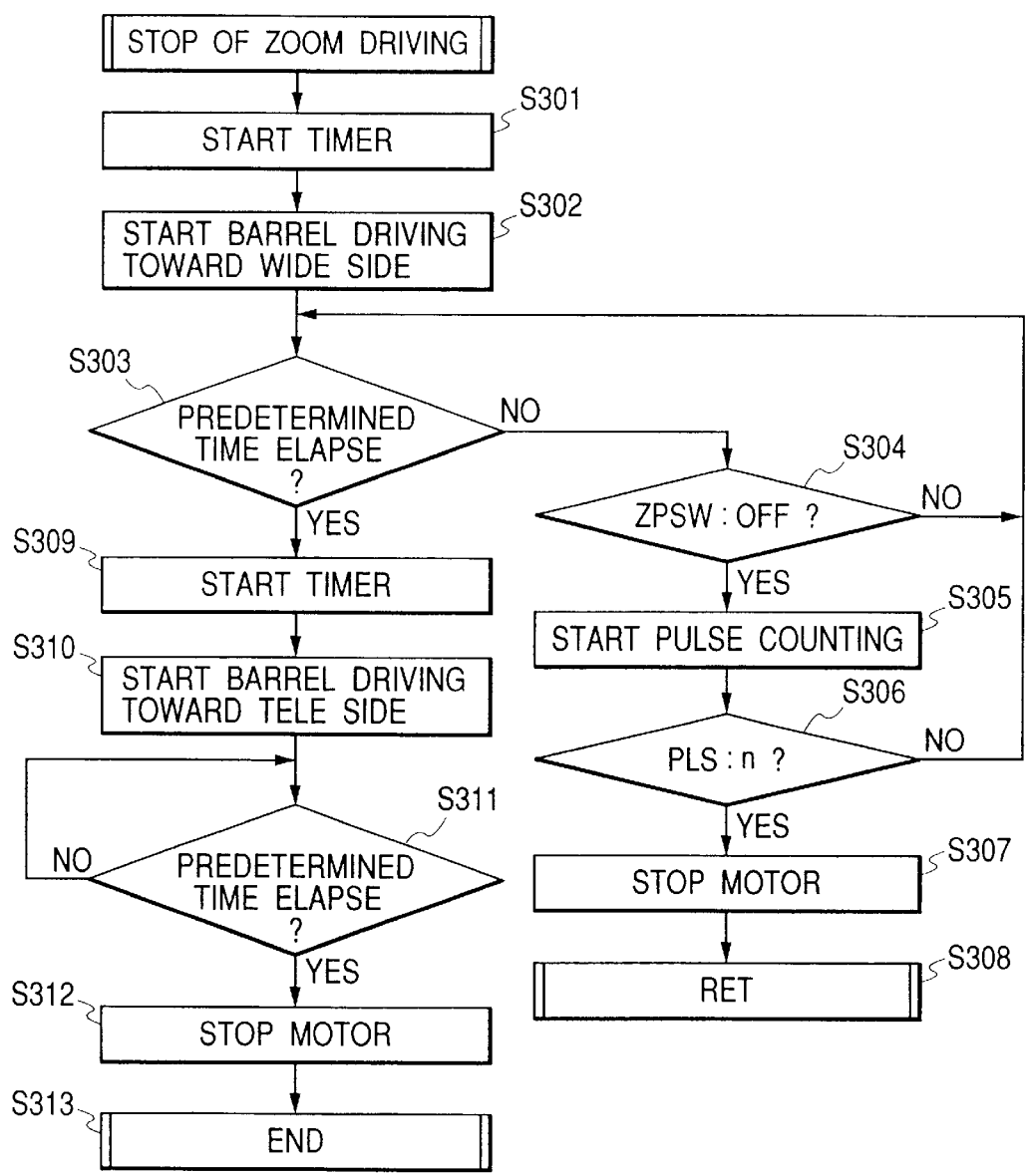
FIG. 13 is a flow chart showing the operation of stopping zoom driving in the fourth embodiment of the present invention.

FIG. 13 is a flow chart showing the operation of stopping zoom driving.

First, at step S301, a timer for detecting any abnormality during barrel driving from a position in which the switch ZPSW has become ON to the wide angle end waiting position W of zoom is started, and advance is made to step S302. At step S302, in order to drive the lens barrel from the position in which the switch ZPSW has become ON to the wide angle end waiting position W of zoom, the barrel motor M is driven toward the wide angle side through the barrel motor driving means 2. At the next step S303, it is determined whether the timer time for the detection of abnormality has elapsed, and if the timer time has not yet elapsed, advance is made to step S304, where it is determined whether the switch ZPSW for indicating the reference position of the wide angle end waiting position W of zoom, through the barrel position detecting means 3, becomes OFF. If the switch ZPSW is ON, step S303 and step S304 are repeated, until the switch ZPSW becomes OFF.

When at step S304, the switch ZPSW becomes OFF, advance is made to step S305, where pulse counting of the pulse signal PLS is started through the barrel position detecting means 3. At the next step S306, it is determined whether the count number of the pulse signal PLS has reached a predetermined number corresponding to the wide angle end waiting position W of zoom, and if the count number of PLS has not yet reached the predetermined number, steps S303→S304→S305→S306 are repeated, until the count number of PLS reaches the predetermined number. Also, when at step S306, the count number of the pulse signal PLS reaches the predetermined number, advance is made to step S307, where the driving of the barrel motor M toward the wide angle side, which has been effected through the barrel motor driving means 2, is stopped, and advance is made to step S308, where by the RET command, return is made to the original flow. While the case where driving toward the wide angle end waiting position W of zoom is stopped has been described here as an example, stoppage at other zoom waiting positions is also similar.

Also, if an abnormality occurs to the barrel position detecting means 3 and, at step S304, the switch ZPSW does not become OFF, or at step S306, the count number of the pulse signal PLS does not reach the predetermined number, the timer time elapses at step S303 and advance is made to step S309. Here, the timer time is usually set to a time sufficiently longer than the time required for driving toward the wide angle end waiting position W of zoom, and therefore, in a state in which the timer has elapsed, the lens barrel not only passes the wide angle end waiting position W of zoom, but also is driven to the releasing position of the lock mechanism for the cartridge chamber cover. In the present embodiment, in order that the lens barrel driven to the releasing position of the lock mechanism for the cartridge chamber cover may be returned to the locking position, driving toward the tele side is effected for a predetermined time in accordance with the following flow (S309–S312).

That is, at step S309, the time of a predetermined time sufficient to drive the lens barrel from the releasing position of the lock mechanism for the cartridge chamber cover to the locking position is started, and at the next step S310, the barrel motor M is driven toward the tele side through the barrel motor driving means 2 in order to drive the lens barrel from the releasing position of the lock mechanism for the cartridge chamber cover to the locking position. At the next step S311, it is determined whether the timer time has elapsed, and if the timer time has not yet elapsed, step S311 is repeated. Also, if at S311, the timer time has elapsed, advance is made to step S312, where driving of the barrel motor M toward the tele side, which has been effected through the barrel motor driving means 2, is stopped, and advance is made to step S313, where all operations are stopped and terminated because the camera is out of order.

In this case, the lock mechanism for the cartridge chamber cover is set at the locking position by the driving of the lens barrel toward the tele side and therefore, it is possible to prevent a user from opening the cartridge chamber cover by mistake.

Figure 14:
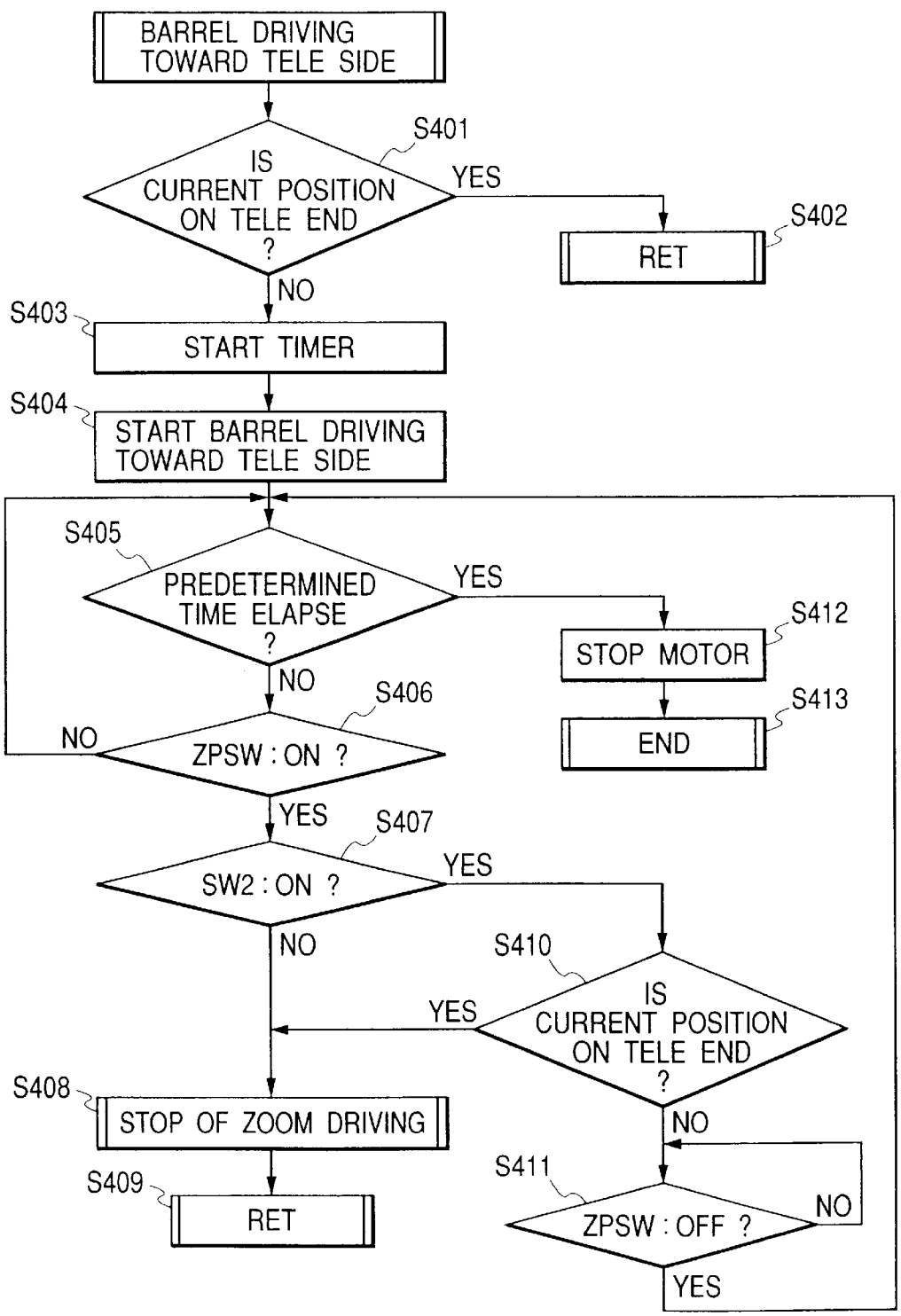
FIG. 14 is a flow chart showing the operation of driving the barrel toward the telephoto side in the fourth embodiment of the present invention.

FIG. 14 is a flow chart showing the operation of driving the lens barrel toward the tele side.

First, at step S401, it is determined whether the current zoom waiting position is on the tele end T, and if the current zoom waiting position is on the tele end T, advance is made to step S402, where by the RET command of step S402, return is made to the main flow of FIG. 11. Also, if at step S401, the current zoom waiting position is not on the tele end T, advance is made to step S403, where a timer for detecting any abnormality when the lens barrel is being driven toward the tele side of zoom is started. At the next step S404, the barrel motor M is driven toward the tele side, through the barrel motor driving means 2, in order to drive the lens barrel toward the tele side of zoom, and advance is made to step S405.

At step S405, it is determined whether the timer time for the detection of abnormality has elapsed, and if the timer time has not yet elapsed, advance is made to step S406, where it is determined whether the switch ZPSW for indicating the reference position of the zoom waiting position, through the barrel position detecting means 3, becomes ON. If here, the switch ZPSW is OFF, step S405 and step S406 are repeated, until the switch ZPSW becomes ON. Also, if at step S406, the switch ZPSW becomes ON, advance is made to step S407, where it is determined whether the tele switch SW2 for indicating driving toward the tele side of zoom is ON, and if the tele switch SW2 for indicating driving toward the tele side of zoom is OFF, advance is made to step S408, where a stop driving to the zoom waiting position, which is the flow of the zoom driving stoppage of FIG. 13, is effected, and at the next step S409, by the RET command, return is made to the main flow of FIG. 11.

Also, if at step S407, the tele switch SW2 for indicating driving toward the tele side of zoom is ON, advance is made to step S410. Here, it is determined whether the zoom position is on the tele side, and if the zoom position is on the tele end, advance is made to step S408, where a stop driving to the zoom waiting position is effected, and return is made to the main flow of FIG. 11. Also, if at step S410, the zoom position is not on the tele end, advance is made to step S411, where it is determined whether the switch ZPSW for indicating the reference position of the zoom waiting position through the barrel position detecting means 3 becomes OFF, and if this switch ZPSW is ON, step S411 is repeated, until the switch ZPSW becomes OFF. When thereafter, the switch ZPSW becomes OFF, return is made to step S405 for the driving toward the next zoom waiting position.

Also, if at step S406, an abnormality occurs to the barrel position detecting means 3 and the ON state of the switch ZPSW cannot be detected, the timer time elapses at step S405, and advance is made to step S412. At step S412, driving of the barrel motor M toward the tele side, which has been effected through the barrel motor driving means 2, is stopped. At the next step S413, all operations are stopped and terminated because the camera is out of order.

Since this case is after the lens barrel has been driven toward the tele side, the lock mechanism for the cartridge chamber cover remains in the locking position.

Figure 15:
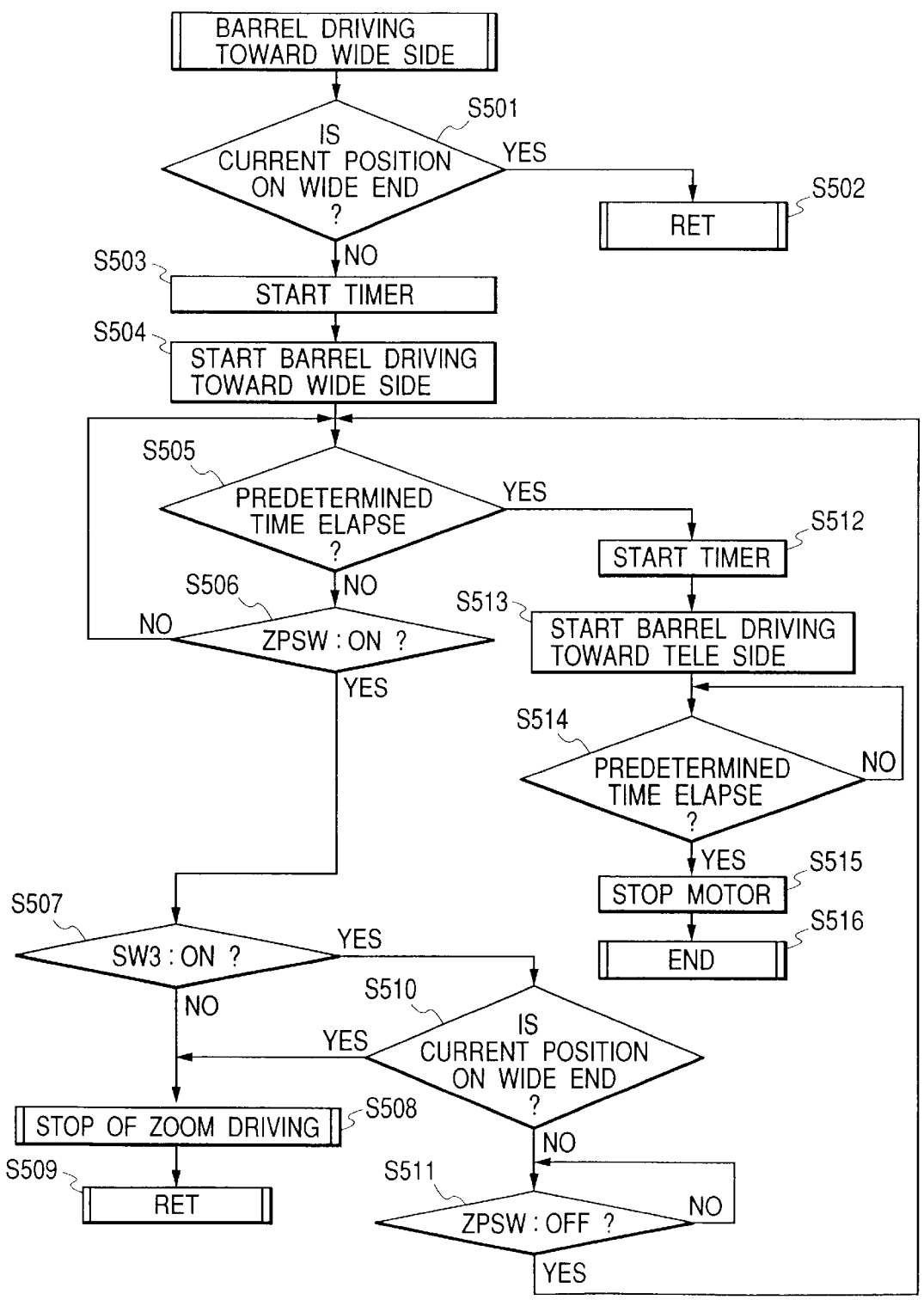
FIG. 15 is a flow chart showing the operation of driving the barrel toward the wide angle side in the fourth embodiment of the present invention.

FIG. 15 is a flow chart showing the operation of driving the lens barrel toward the wide angle side.

First, at step S501, it is determined whether the current zoom waiting position is on the wide angle end W, and if the current zoom waiting position is on the wide angle end W, advance is made to step S502, where by the RET command, return is made to the main flow of FIG. 11. Also, if at step S501, the current zoom waiting position is not on the wide angle end W, advance is made to step S503, where a timer for detecting any abnormally when the lens barrel is being driven toward the wide angle side of zoom is started. At the next step S504, the barrel motor M is driven toward the wide angle side, through the barrel motor driving means 2, in order to drive the lens barrel toward the wide angle side of zoom, and advance is made to step S505.

At step S505, it is determined whether the timer time for the detection of abnormality has elapsed, and if the timer time has not yet elapsed, advance is made to step S506, where it is determined whether the switch ZPSW for indicating the reference position of the zoom waiting position, through the barrel position detecting means 3, becomes ON. If here this switch ZPSW is OFF, step S505 and step S506 are repeated, until the switch ZPSW becomes ON. Also, if at step S506, the switch ZPSW becomes ON, advance is made to step S507, where it is determined whether the wide switch SW3 for indicating driving toward the wide angle side of zoom is ON, and if the wide switch SW3 for indicating driving toward the wide angle side of zoom is OFF, advance is made to step S508, where a stop driving to the zoom waiting position, which is the flow of the zoom driving stoppage of FIG. 13, is effected, and advance is made to step S509, where by the RET command, return is made to the main flow of FIG. 11.

Also, if at step S507, the wide step S507, the wide switch SW3 for indicating driving toward the wide angle side of zoom is ON, advance is made to step S510, where it is determined whether the zoom position is on the wide angle end. If here, the zoom position is on the wide angle end, advance is made to step S508, where a stop driving to the zoom waiting position is effected, and return is made to the main flow of FIG. 11. Also, if at step S510, the zoom position is not on the wide angle end, advance is made to step S511, where it is determined whether the switch ZPSW for indicating the reference position of the zoom waiting position, through the barrel position detecting means 3, becomes OFF, and if this switch ZPSW is ON, step S511 is repeated, until the switch ZPSW becomes OFF. When thereafter, the switch ZPSW becomes OFF, return is made to step S505 for driving to the next zoom waiting position.

Also, if at step S506, an abnormality occurs to the barrel position detecting means 3, and the ON state of the switch ZPSW cannot be detected, the timer time elapses at step S505, and advance is made to step S512. Here, the timer time is usually set to a time sufficiently longer than the time required for driving toward the wide angle end waiting position W of zoom, and therefore, in the state in which the timer time has elapsed, the lens barrel not only passes the wide angle end waiting position W of zoom, but also is driven to the releasing position of the lock mechanism for the cartridge chamber cover. In the present embodiment, in order that the lens barrel driven to the releasing position of the lock mechanism for the cartridge chamber cover may be returned to the locking position, driving is effected toward the tele side for a predetermined time in accordance with the following flow (S512–S515).

That is, at step S512, the timer of a predetermined time sufficient to drive the lens barrel from the releasing position of the lock mechanism for the cartridge chamber cover to the locking position is started, and at the next step S513, the barrel motor M is driven toward the tele side, through the barrel motor driving means 2, in order to drive the lens barrel from the releasing position of the lock mechanism for the cartridge chamber cover to the locking position. At the next step S514, it is determined whether the timer time has elapsed. If the timer time has not yet elapsed, step S514 is repeated, and when the timer time elapses, advance is made to step S515. At step S515, driving of the barrel motor M toward the tele side, which has been effected through the barrel motor driving means 2, is stopped, and at the next step S516, all operations are stopped and terminated because the camera is out of order.

In this case, the lock mechanism for the cartridge chamber cover is set at the locking position by the driving of the lens barrel toward the tele side and therefore, it is possible to prevent the user from opening the cartridge chamber cover by mistake.

Figure 16:
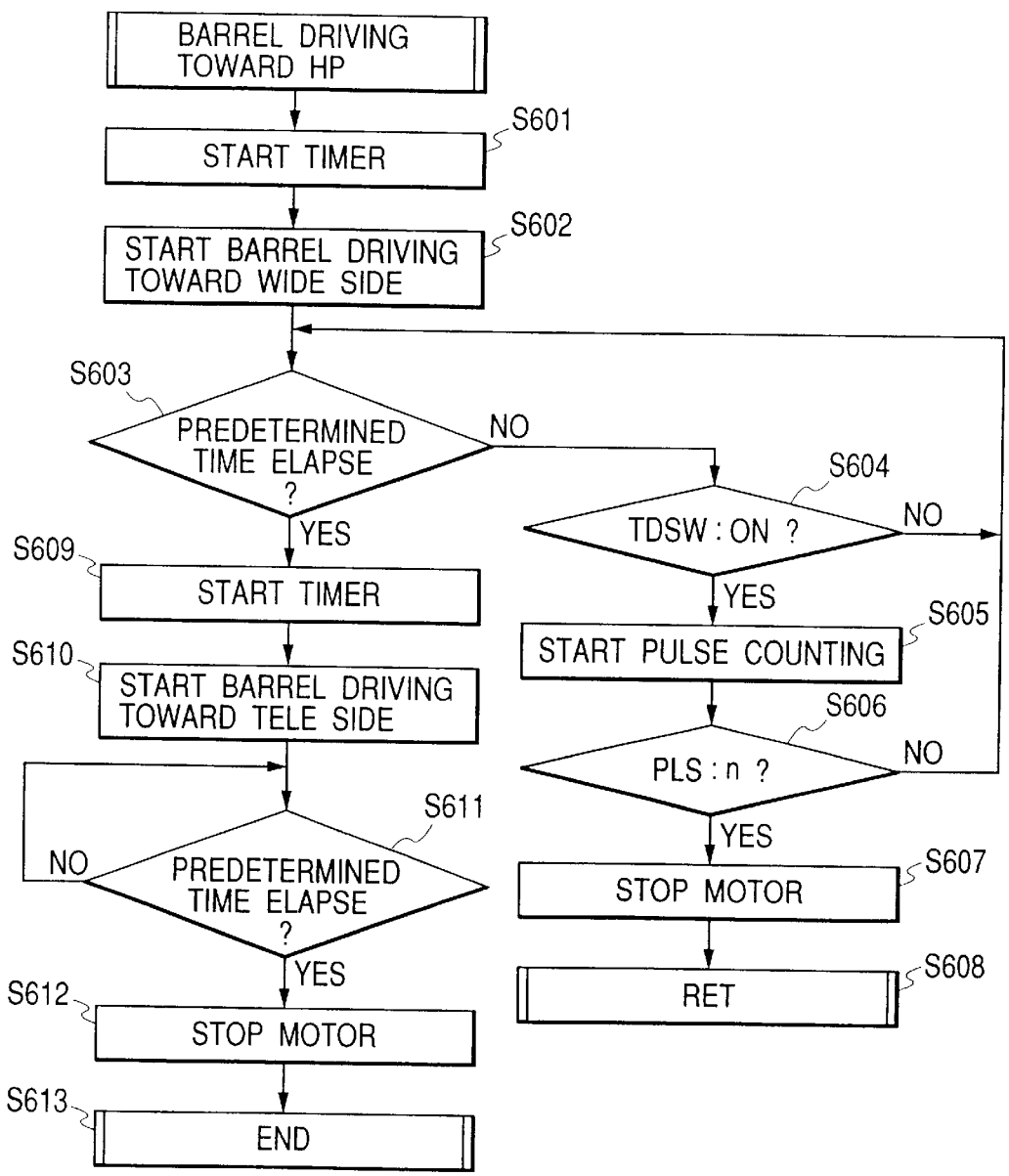
FIG. 16 is a flow chart showing the operation of driving the barrel toward a contained position in the fourth embodiment of the present invention.

FIG. 16 is a flow chart showing the operation of driving the lens barrel toward the contained position.

First, at step S601, a timer for detecting any abnormality during the driving of the lens barrel from the waiting position of zoom toward the contained position of the lens barrel is started. At the next step S602, the barrel motor M is driven toward the wide angle side, through the barrel motor driving means 2, in order to drive the lens barrel from the waiting position of zoom toward the contained position of the lens barrel. At the subsequent step S603, it is determined whether the timer time for the detection of abnormality has elapsed, and if the timer time has not yet elapsed, advance is made to step S604, where it is determined whether the switch TDSW for indicating the reference position of the lens containing position, through the barrel position detecting means 3, becomes ON. If here the switch TDSW is OFF, step S603 and step S604 are repeated, until switch TDSW becomes ON. When thereafter, the switch TDSW becomes ON, advance is made to step S605, where pulse counting of the pulse signal PLS is started, through the barrel position detecting means 3, and advance is made to step S606.

At step S606, it is determined whether the count number of the pulse signal PLS has reached a predetermined number corresponding to the lens containing position HP, and if the count number of PLS has not yet reached the predetermined number, steps S603→S604→S605→S606 are repeated, until the count number of PLS reaches the predetermined number. When thereafter, the count number of PLS reaches the predetermined number, advance is made to step S607, where driving of the barrel motor M toward the wide angle side, which has been effected through the barrel motor driving means 2, is stopped, and advance is made to the next step S608. The step S608 is the RET command, by which return is made to the main flow of FIG. 11.

Also, if an abnormality occurs to the barrel position detecting means 3, and at step S604, the switch TDSW does not become ON, or at step S606, the count number of PLS does not reach the predetermined number, the timer time elapses at step S603 and advance is made to step S609. The timer time is usually set to a time sufficiently longer than the time required for driving to the lens containing position HP, and therefore, in the state in which the timer time has elapsed, the lens barrel not only passes the lens containing position HP, but also is driven to the releasing position of the lock mechanism for the cartridge chamber cover. In the present embodiment, in order that the lens barrel driven to the releasing position of the lock mechanism for the cartridge chamber cover may be returned to the locking position, driving is effected toward the tele side for a predetermined time in accordance with the following flow (S609–S612).

That is, at step S609, the timer of a predetermined time sufficient to drive the lens barrel from the releasing position of the lock mechanism for the cartridge chamber cover to the locking position is started, and at the subsequent step S610, the barrel motor M is driven toward the tele side, through the barrel motor driving means 2, in order to drive the lens barrel from the releasing position of the lock mechanism for the cartridge chamber cover to the locking position, and advance is made to step S611. At step S611, it is determined whether the timer time has elapsed, and if here the timer time has not yet elapsed, step S611 is repeated. Also, when at step S611, the time elapses, advance is made to step S612, where driving of the barrel motor M toward the tele side, which has been effected through the barrel motor driving means 2, is stopped, and advance is made to step S613. At step S613, all operations are stopped and terminated because the camera is out of order.

In this case, the lock mechanism for the cartridge chamber cover is set at the locking position by driving of the lens barrel toward the tele side, and therefore, it is possible to prevent the user from opening the cartridge chamber cover by mistake.

According to the above-described fourth embodiment, design is made such that when an abnormality is detected when the lens barrel is being driven in a direction to effect at least the unlocking of the cartridge chamber cover, the lens barrel is driven for a predetermined time in a direction to effect the locking of the cartridge chamber cover, and therefore, even when an abnormality occurs to the mechanism for detecting the position of the photo-taking lens barrel and the detection of the position thereof is impossible, the lens barrel is driven in the direction to effect the locking of the cartridge chamber cover, and therefore, it becomes possible to reliably prevent the problem that the user opens the cartridge chamber cover by mistake and the film in the camera is exposed or the film is broken.

Fifth Embodiment

Figure 17:
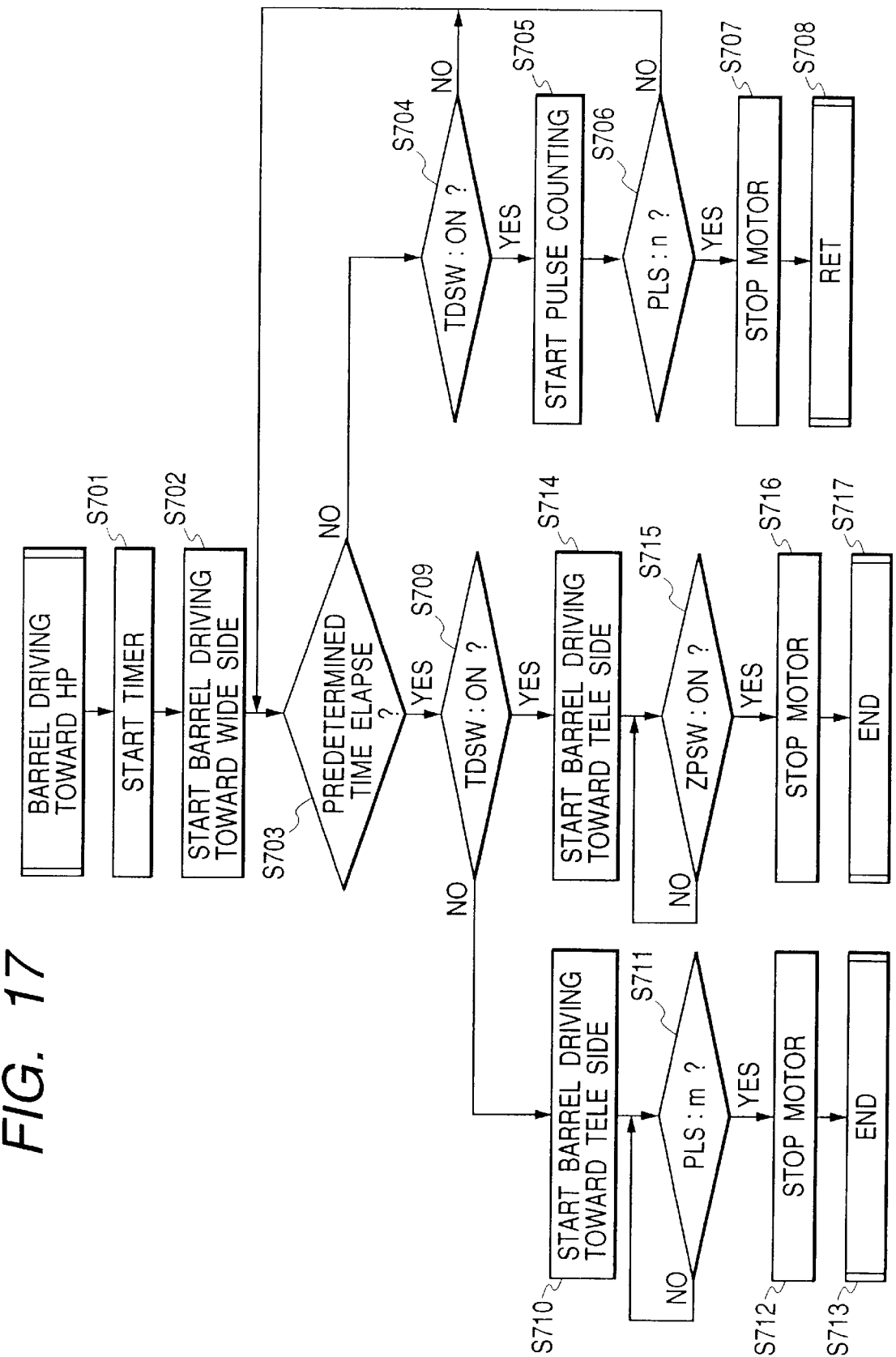
FIG. 17 is a flow chart showing the operation of driving the barrel toward the contained position in a camera according to a fifth embodiment of the present invention.

FIG. 17 is a flow chart showing the operation of barrel driving toward the contained position according to the fifth embodiment of the present invention of the camera having the circuit construction of FIG. 9. The other operations of this embodiment are similar to those of the above-described fourth embodiment, and therefore need not be described.

First, at step S701, a timer for detecting any abnormality during the driving of the lens barrel from the waiting position of zoom to the contained position of the lens barrel is started. At the next step S702, the barrel motor M is driven toward the wide angle side, through the barrel motor driving means 2, in order to drive the lens barrel from the waiting position of zoom to the contained position of the lens barrel. At the subsequent step S703, it is determined whether the timer time for the detection of abnormality has elapsed, and if the timer time has not yet elapsed, advance is made to step S704, where it is determined whether the switch TDSW for indicating the reference position of the lens containing position, through the barrel position detecting means 3, becomes ON, and if her this switch TDSW is OFF, step S703 and step S704 are repeated, until the switch TDSW becomes ON.

When at step S704, the switch TDSW becomes ON, advance is made to step S705, where pulse counting of the pulse signal PLS is started through the barrel position detecting means 3. At the next step S706, it is determined whether the count number of the pulse signal PLS has reached a predetermined number corresponding to the lens containing position BP, and if the count number of PLS has not yet reached the predetermined number, step S703→S704→S705→S706 are repeated, until the count number of PLS reaches the predetermined number. When thereafter, at step S706, the count number of PLS reaches the predetermined number, advance is made to step S707, where driving of the barrel motor M toward the wide angle side, which has been effected through the barrel motor driving means 2, is stopped, and advance is made to step S708, where by the RET command, return is made to the main flow of FIG. 11.

Also, if an abnormality occurs to the barrel position detecting means 3, and at step S704, the switch TDSW does not become ON, or at step S706, the count number of the PLS does not reach the predetermined number, the timer time elapses at step S703, and advance is made to step S709. The timer time is usually set to a time sufficiently longer than the time required for the driving of the lens barrel to the lens containing position HP, and therefore, in the state in which the timer time has elapsed, the lens barrel not only passes the lens containing position HP, but also is driven to the releasing position of the lock mechanism for the cartridge chamber cover. In the present embodiment, in order that the lens barrel driven to the releasing position of the lock mechanism for the cartridge chamber cover may be returned to the locking position, driving is effected toward the tele side for a predetermined time in accordance with the following flow (S709–S716).

That is, at step S709, it is determined whether the switch TDSW for indicating the reference position of the lens containing position, through the barrel position detecting means 3, is ON, and if the ON state of this switch TDSW cannot be detected, advance is made to step S710, where the barrel motor is M is driven toward the tele side, through the barrel motor driving means 2, in order to drive the lens barrel from the releasing position of the lock mechanism for the cartridge chamber cover to the locking position, and advance is made to step S711, where it is determined whether the count number of the pulse signal PLS after the start of the driving toward the tele side, which is necessary to drive the lens barrel from the releasing position of the lock mechanism for the cartridge chamber cover to the locking position, has reached a predetermined number. If at step S711, the count number of PLS has not yet reached the predetermined numbers, step S711 is repeated. When thereafter, at step S711, the count number of PLS reaches the predetermined number, advance is made to step S712, where driving the barrel motor M toward the tele side, which has been effected through the barrel motor driving means 2, is stopped, and advance is made to step S713, where all operations are stopped and terminated because the camera is out of order.

In this case, the lock mechanism for the cartridge chamber cover is set at the locking position by the driving of the lens barrel toward the tele side, and therefore, it is possible to prevent the user from opening the cartridge chamber cover by mistake.

Also, if at step S709, the ON state of the switch TDSW could be detected, advance is made to step S714, where the barrel motor M is driven toward the tele side, through the barrel motor driving means 2, in order to drive the lens barrel from the releasing position of the lock mechanism for the cartridge chamber cover to the locking position, and advance is made to step S715. At step S715, it is determined whether the lens barrel has been driven to a position in which the switch ZPSW for indicating the reference position of the waiting position of zoom becomes ON in order to drive the lens barrel from the releasing position of the lock mechanism for the cartridge chamber cover to the locking position. If here, the switch ZPSW is not yet ON, step S715 is repeated. When at step S715, the switch ZPSW becomes ON, advance is made to step S716, where driving of the barrel motor toward the tele side, which has been effected through the barrel motor driving means 2, is stopped, and advance is made to step S717. At step S717, all operations are stopped and terminated because the camera is out of order.

In this case, the lock mechanism for the cartridge chamber cover is set at the locking position by the driving of the lens barrel toward the tele side, and therefore, it is possible to prevent the user from opening the cartridge chamber cover by mistake.

According to the above-described fifth embodiment, when an abnormality is detected when the lens barrel is being driven in a direction to effect at least the unlocking of the cartridge chamber cover, the lens barrel is driven in a direction to effect the locking of the cartridge chamber cover in accordance with detectable position information (from step S409 of FIG. 9 to step S710–S712 or step S714–S716), and therefore, even when an accident occurs to a portion of the mechanism for detecting the position of the photo-taking lens barrel and the detection of the position thereof is impossible, it becomes possible to reliably prevent the cover from opening, and it becomes possible to reliably prevent the problem that the user opens the cartridge chamber cover by mistake and the film in the camera is exposed or the film is broken.

Of course, the present embodiment is not restricted to the position information of the lens barrel, but may be combined with the timer driving of the predetermined time of the above-described fourth embodiment.

Also, even when an accident occurs when the resetting operation for confirming the position of the lens barrel is performed when a battery which is a power source has been set in the camera, it is possible to perform a similar operation to thereby prevent the user from opening the cartridge chamber cover by mistake.

What is claimed is:

1. A camera provided with a lock control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said camera comprising:

a driving circuit which drives said lens barrel;

a control circuit which controls a driving operation of said driving circuit so as to drive said lens barrel from a predetermined position within said first position range to the second position or a position within the second range to release said locked state, said control circuit having a switch portion that detects a position of said lens barrel, said control circuit detecting the state of said switch portion and controlling the drive operation of said lens barrel based on a detected state of said switch portion so as to drive said lens barrel to said second position or within said second range;

a detecting circuit which detects whether an abnormality has occurred in a driving control operation of the lens barrel by said control circuit from the predetermined position within said first position range to the second position or into the second range; and a circuit which effects a driving operation of said lens barrel toward the second position or the second range independently of the driving control operation by said control circuit when said detecting circuit detects an abnormality in the driving control operation.

2. A camera provided with a lock control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said camera comprising:

a driving circuit which drives said lens barrel;

a control circuit which controls a driving operation of said driving circuit so as to drive said lens barrel from a predetermined position within said first position range to the second position or a position within the second range to release said locked state;

a detecting circuit which detects whether an abnormality has occurred in a driving control operation of the lens barrel by said control circuit from the predetermined position within said first position range to the second position or into the second range; and a continuing circuit which continues a driving operation of said lens barrel toward the second position or the second range when said detecting circuit detects an abnormality in the driving control operation.

3. A camera according to claim 2, wherein said continuing circuit continues the driving operation of said lens barrel for a predetermined time.

4. A camera according to claim 2, wherein said control circuit has a switch portion that detects a position of said lens barrel, detects the state of said switch portion, and controls a driving operation of said driving circuit so as to drive said lens barrel to the second position or a position within the second range.

5. A camera provided with a lock control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said camera comprising:

a driving circuit which drives said lens barrel;

a control circuit which controls a driving operation of said drive circuit so as to drive said lens barrel from a predetermined position within said first position range to the second position or a position within the second range to release said locked state;

a detecting circuit which detects whether an abnormality has occurred in a driving control operation of the lens barrel by said control circuit from the predetermined position within said first position range to the second position or into the second range; and a returning circuit which effects a drive operation of said lens barrel in a direction opposite the direction toward the second position or the second range when said detecting circuit detects an abnormality in the driving control operation, and thereafter again effects a drive operation of said lens barrel in the direction toward the second position or the second range.

6. A camera according to claim 5, wherein said returning circuit effects a drive operation of said lens barrel in the direction opposite the direction toward the second position or the second range for a first time, and thereafter again effects a drive operation of said lens barrel in the direction toward the second position or the second range for a second time longer than the first time.

7. A camera according to claim 2, wherein said detecting circuit has detecting means for detecting that said lens barrel has arrived at a predetermined position which is in a predetermined relation to the second position or the second range, and determines that an abnormality has occurred in the driving control operation of said lens barrel when said detecting means does not detect that said lens barrel has arrived at said predetermined position after said lens barrel is driven toward said second position or said second range for a predetermined time.

8. A camera according to claim 5, wherein said detecting circuit has detecting means for detecting that said lens barrel has arrived at a predetermined position which is in a predetermined relation to the second position or the second range, and determines that an abnormality has occurred in the driving control operation of said lens barrel when said detecting means does not detect that said lens barrel has arrived at said predetermined position after said lens barrel is driven toward said second position or said second range for a predetermined time.

9. A camera provided with a lock control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said camera comprising:

a driving circuit which drives said lens barrel;

a control circuit which controls a driving operation of said driving circuit so as to drive said lens barrel from a predetermined position within said first position range to the second position or a position within the second range to release said locked state, said control circuit detecting a position of the lens barrel and stopping the driving operation of said driving circuit when said control circuit detects said lens barrel has shifted to the second position or a position within the second range; and a timer circuit which stops the driving operation of the lens barrel by said driving circuit upon the lapse of a predetermined time, if the driving operation of said lens barrel in the direction toward the second position or a position within the second range by said control circuit has not stopped when the predetermined time has elapsed.

10. A camera according to claim 9, further comprising a pulse signal producing circuit which produces a pulse signal in accordance with movement of said lens barrel, and a stopping circuit which stops the driving operation of said lens barrel upon detecting that the pulse signal has produced a predetermined number of pulses before the elapse of the predetermined time and the driving operation of the lens barrel by said control circuit has not stopped.

11. A camera provided with a lock control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said camera comprising:

a driving circuit which drives said lens barrel; and a regulating circuit which regulates a driving operation of said driving circuit so as to drive said lens barrel in a direction opposite the direction from a predetermined position within said first position range toward the second position or a position within the second range when any abnormality is detected during the driving operation of said lens barrel while said lens barrel is driven in the direction from the predetermined position within said first position range toward the second position or a position within the second range by said driving circuit.

12. A camera according to claim 11, wherein said regulating circuit regulates the driving operation of said lens barrel for a predetermined time.

13. A camera according to claim 11, further comprising a judging circuit which determines that an abnormality has occurred during the driving operation when the lens barrel does not stop at a predetermined position after said lens barrel is driven in the direction from a predetermined position within said first position range toward the second position or a position within the second range by said driving circuit.

14. A camera according to claim 11, further comprising a barrel position detecting circuit which detects a position of said lens barrel, and wherein when said judging circuit determines that an abnormality has occurred, said regulating circuit regulates the driving operation so as to drive the lens barrel in conformity with position information detected by said barrel position detecting circuit.

15. A camera according to claim 14, wherein said barrel position detecting circuit has a pulse forming circuit that forms a pulse signal in conformity with the driving of said lens barrel, and said regulating circuit regulates a driving operation of said lens barrel until the number of the pulse signals from said pulse forming circuit becomes equal to a predetermined number.

16. A camera provided with a lock control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said camera comprising:

a driving circuit which drives said lens barrel in a zooming operation;

a lens position stop control circuit which stops a lens of said lens barrel at a predetermined position; and a regulating circuit which regulates a driving operation of said driving circuit so as to drive said lens barrel in a direction opposite the direction from a predetermined position within said first position range toward the second position or a position within the second range and stops said lens barrel when proper stop position control cannot be effected by said stop control circuit.

17. A camera according to claim 16, wherein said lens position stop control circuit stops the lens barrel at a predetermined zoom position during control of a zoom position by the zooming operation.

18. A lens barrel control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said apparatus comprising:

a driving circuit which drives said lens barrel;

a control circuit which controls a driving operation of said driving circuit so as to drive said lens barrel from a predetermined position within said first position range to the second position or a position within the second range to release said locked state, said control circuit having a switch portion that detects a position of said lens barrel, detects the state of said switch portion, and controls a driving operation of said driving circuit so as to drive said lens barrel to the second position or a position within the second range;

a detecting circuit which detects whether an abnormality has occurred in a driving control operation of the lens barrel from a predetermined position within said first position range to the second position or into the second range by said control circuit; and a circuit which effects a driving operation of said lens barrel in the direction toward the second position or the second range, independently of the control operation by said control circuit, when said detecting circuit detects an abnormality.

19. A lens barrel control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said apparatus comprising:

a driving circuit which drives said lens barrel;

a control circuit which controls a driving operation of said driving circuit so as to drive said lens barrel from a predetermined position within said first position range to the second position or a position within the second range to release said locked state;

a detecting circuit which detects whether an abnormality has occurred in a driving control operation of the lens barrel from the predetermined position within said first position range to the second position or into the second range by said control circuit; and a continuing circuit which continues a driving operation of said lens barrel in the direction toward the second position or the second range when said detecting circuit detects an abnormality.

20. A lens barrel control apparatus according to claim 19, wherein said continuing circuit continues the driving operation of said lens barrel for a predetermined time.

21. A lens barrel control apparatus according to claim 19, wherein said control circuit has a switch portion that detects a position of said lens barrel, detects the state of said switch portion, and controls the driving operation of said drive circuit so as to drive said lens barrel to the second position or a position within the second range.

22. A lens barrel control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said apparatus comprising:

a driving circuit which drives said lens barrel;

a control circuit which controls a driving operation of said driving circuit so as to drive said lens barrel from a predetermined position within said first position range to the second position or a position within the second range to release said locked state;

a detecting circuit which detects whether an abnormality has occurred in a driving control operation of the lens barrel from the predetermined position within said first position range to the second position or into the second range by said control circuit; and a returning circuit which effects a driving operation of said lens barrel in a direction opposite the direction toward the second position or the second range when said detecting circuit detects an abnormality in the driving operation, and thereafter again effects a driving operation of said lens barrel in the direction toward the second position or the second range.

23. A lens barrel control apparatus according to claim 22, wherein said returning circuit effects a driving operation of said lens barrel in the direction opposite the direction toward the second position or the second range for a first time, and thereafter again effects a driving operation of said lens barrel in the direction toward the second position or the second range for a second time longer than the first time.

24. A lens barrel control apparatus according to claim 19, wherein said detecting circuit has detecting means for detecting that said lens barrel has arrived at a predetermined position which is in a predetermined relation to the second position or the second range, and determines that an abnormality has occurred in the driving operation of said lens barrel when said detecting means does not detect that said lens barrel has arrived at said predetermined position after said lens barrel is driven in the direction toward said second position or said second range for a predetermined time.

25. A lens barrel control apparatus according to claim 22, wherein said detecting circuit has detecting means for detecting that said lens barrel has arrived at a predetermined position which is in a predetermined relation to the second position or the second range, and determines that an abnormality has occurred in the driving operation of said lens barrel when said detecting means does not detect that said lens barrel has arrived at said predetermined position after said lens barrel is driven in the direction toward said second position or said second range for a predetermined time.

26. A lens barrel control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said apparatus comprising:

a driving circuit which drives said lens barrel;

a control circuit which controls a driving operation of said driving circuit so as to drive said lens barrel from a predetermined position within said first position range to the second position or a position within the second range to release said locked state, said control circuit detecting a position of the lens barrel, and stopping the driving operation by said driving circuit when said control circuit detects that said lens barrel has shifted to the second position or a position within the second range; and a timer circuit which stops the driving operation of said lens barrel by said driving circuit upon the lapse of a predetermined time, if the driving operation of said lens barrel in the direction toward the second position or a position within the second range by said control circuit has not stopped after the predetermined time has elapsed.

27. A lens barrel control apparatus according to claim 26, further comprising a pulse signal producing circuit which produces a pulse signal in accordance with movement of said lens barrel, and a stopping circuit which detects the number of times the pulse signal is generated by said pulse signal producing circuit and stops the driving operation of said lens barrel if said stopping circuit detects that said pulse signal has been produced a predetermined number of times before the elapse of said predetermined time.

28. A lens barrel control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said apparatus comprising:

a driving circuit which drives said lens barrel; and a regulating circuit which regulates a driving operation of said driving circuit so as to drive said lens barrel in a direction opposite the direction from a predetermined position within said first position range toward the second position or a position within the second range when any abnormality is detected during the driving operation of said lens barrel while said lens barrel is driven in the direction from the predetermined position within said first position range toward the second position or a position within the second range by said driving circuit.

29. A lens barrel control apparatus according to claim 28, wherein said regulating circuit regulates the driving operation of said lens barrel for a predetermined time.

30. A lens barrel control apparatus according to claim 28, further comprising a judging circuit which determines that an abnormality has occurred if the lens barrel does not stop at a predetermined position when said lens barrel is driven in the direction from a predetermined position within said first position range toward the second position or a position within the second range by said driving circuit.

31. A lens barrel control apparatus according to claim 28, further comprising a barrel position detecting circuit which detects a position of said lens barrel, and wherein when an abnormality is detected, said regulating circuit regulates the driving operation so as to drive the lens barrel in conformity with position information detected by said barrel position detecting circuit.

32. A lens barrel control apparatus according to claim 31, wherein said barrel position detecting circuit has a pulse forming circuit that forms a pulse signal in conformity with the driving operation of said lens barrel, and said regulating circuit regulates the driving operation so as to drive said lens barrel until the number of the pulse signals from said pulse forming circuit equals a predetermined number.

33. A lens barrel control apparatus for bringing a cartridge chamber cover into a locked state in a predetermined first position range within the movement range of a lens barrel, and making the locked state of the cartridge chamber cover releasable in a second position or a second range differing from said predetermined first position range within said movement range, said apparatus comprising:

a driving circuit which drives said lens barrel;

a lens position stop control circuit which stops a lens of said lens barrel at a predetermined position; and a regulating circuit which regulates a driving operation of said driving circuit so as to drive said lens barrel in a direction opposite the direction from a predetermined position within said first position range toward the second position or a position within the second range, and stops said lens barrel when proper stop position control cannot be effected by said lens position stop control circuit.

34. A lens barrel control apparatus according to claim 33, wherein said lens position stop control circuit stops the lens of said lens barrel at a predetermined zoom position during the control of a zoom position in a zooming operation.

* * * * *

UNITED STATES PATENT AND TRADEMARK OFFICE
CERTIFICATE OF CORRECTION

PATENT NO. : 6,357,935 B1
DATED : March 19, 2002
INVENTOR(S) : Hideo Taka et al.

It is certified that error appears in the above-identified patent and that said Letters Patent is hereby corrected as shown below:

Column 3,
Line 43, "s tar ted. At" should read -- started. At --.

Column 4,
Line 36, "at a" should read -- at the --.
Line 58, "abnormal," should read -- abnormal, --.

Column 7,
Line 44, "t he" should read -- the --.

Column 18,
Line 45, "said" should read -- that said --.

Signed and Sealed this

Eighteenth Day of June, 2002

*Attest:*

*Attesting Officer*

JAMES E. ROGAN
*Director of the United States Patent and Trademark Office*